United States Patent
Maeda et al.

(10) Patent No.: US 10,435,508 B2
(45) Date of Patent: Oct. 8, 2019

(54) FLAME-RETARDANT RESIN COMPOSITION

(71) Applicant: ASAHI KASEI KABUSHIKI KAISHA, Chiyoda-ku, Tokyo (JP)

(72) Inventors: Chihiro Maeda, Tokyo (JP); Mihoko Yamamoto, Tokyo (JP); Akira Mitsui, Tokyo (JP)

(73) Assignee: ASAHI KASEI KABUSHIKI KAISHA, Chiyoda-ku, Tokyo (JP)

( * ) Notice: Subject to any disclaimer, the term of this patent is extended or adjusted under 35 U.S.C. 154(b) by 84 days.

(21) Appl. No.: 15/723,615

(22) Filed: Oct. 3, 2017

(65) Prior Publication Data

US 2018/0094102 A1   Apr. 5, 2018

(30) Foreign Application Priority Data

Oct. 4, 2016 (JP) .................. 2016-196746

(51) Int. Cl.
| | |
|---|---|
| *C08G 65/44* | (2006.01) |
| *C08K 3/32* | (2006.01) |
| *C08K 5/523* | (2006.01) |
| *C08G 65/48* | (2006.01) |
| *C08L 71/12* | (2006.01) |

(52) U.S. Cl.
CPC .......... *C08G 65/44* (2013.01); *C08G 65/485* (2013.01); *C08K 3/32* (2013.01); *C08K 5/523* (2013.01); *C08L 71/126* (2013.01); *C08K 2003/323* (2013.01); *C08K 2003/324* (2013.01); *C08K 2003/326* (2013.01)

(58) Field of Classification Search
CPC .............................. C08G 65/44; C08G 65/485
See application file for complete search history.

(56) References Cited

U.S. PATENT DOCUMENTS

| | | | | |
|---|---|---|---|---|
| 5,455,292 A | * | 10/1995 | Kakegawa | ............. C08K 5/523 524/127 |
| 6,093,760 A | * | 7/2000 | Nishihara | ................ C08J 3/226 252/609 |
| 2017/0204263 A1 | | 7/2017 | Ishii et al. | |
| 2019/0119492 A1 | | 4/2019 | Maeda et al. | |

FOREIGN PATENT DOCUMENTS

| | | |
|---|---|---|
| CN | 105745278 A | 7/2016 |
| CN | 108350267 A | 7/2018 |
| JP | 2925646 B2 | 7/1999 |
| JP | 5704936 B2 | 4/2015 |

* cited by examiner

*Primary Examiner* — Arrie L Reuther

(74) *Attorney, Agent, or Firm* — Kenja IP Law PC

(57) ABSTRACT

Provided is a flame retardant resin composition excellent in flame retardance, and surface smoothness, appearance, flame retardance and electrical properties after a long-term thermal aging (e.g. 150° C., 500 hours) while maintaining mechanical and electrical properties.

The disclosed flame retardant resin composition is a flame retardant resin composition containing a polyphenylene ether, in which, based on UL94 flammability test, an average burning time of a molded product having a length of 12.6 cm, a width of 1.3 cm and a thickness of 1.6 mm formed of the flame retardant resin composition before and after the aging processing in which the molded product is left to stand at 150° C. for 1000 hours under the atmospheric pressure is within 10 seconds, and a change rate of chloroform-insoluble component of the molded product before and after the aging processing is 15 mass % or less.

13 Claims, No Drawings

FLAME-RETARDANT RESIN COMPOSITION

TECHNICAL FIELD

This disclosure relates to a flame-retardant resin composition.

BACKGROUND

A resin composition based on a polyphenylene ether (hereinafter referred to as "PPE")-based resin has characteristics such as thermal resistance, electrical properties, size stability, impact resistance, low specific gravity or the like, and can be made flame retardant without use of halogen compound or antimony compound that places a heavy burden on the environment, and thus is used in a wide range of applications such as various electric/electronic components, office appliance parts, automobile parts, building materials, other various exterior materials, industrial supplies or the like.

In recent years, in addition to short-term properties, long-term properties are also required to achieve miniaturization and high performance, and maintenance of mechanical strength and retention of flame retardancy when placed under high temperature environment over a long period of time are also required for polyphenylene ether-based resin composition.

As a method of increasing the thermal stability of the polyphenylene ether developed so far, a technique in which a specific hydrogenated block copolymer and a specific flame retardant are added at a specific ratio and further a specific production method is used (see JP5704936 B2 (PTL1)), and a technique in which a polyphenylene ether terminal is stabilized by adding a vinyl compound (see JP2925646 B2 (PTL2)) or the like are known.

CITATION LIST

Patent Literature

PTL1: JP5704936 B2
PTL2: JP2925646 B2

SUMMARY

However, while the low temperature or short term aging properties of the above described PPE-based resin composition can be improved, an improvement of the PPE-based resin composition in terms of high temperature and long term aging such as at 150° C. for 500 hours or more has been required so that change in mechanical properties is less likely to occur and flame retardancy is not decreased. Further, there was a problem that addition of excessive amount of flame retardant in anticipation of decrease in flame retardancy after aging may lead to a significant decline in thermal resistance or impact strength of the resin composition.

Thus, an objective of this disclosure is to provide a flame retardant resin composition excellent in flame retardance, and surface smoothness, appearance, flame retardance and electrical properties after a long term thermal aging (e.g. at 150° C. for 500 hours) while maintaining mechanical/electrical properties.

The inventors of this disclosure made extensive studies to solve the above described problem and found that the problem could be solved by, in a composition containing a polyphenylene ether, setting the average burning time and the change rate of chloroform-insoluble component before and after leaving the flame retardant resin composition to stand at 150° C. for 1000 hours (aging processing) to a specific value or less. This finding led to this disclosure.

This disclosure is described below.

[1] A flame retardant resin composition containing a polyphenylene ether, in which, based on UL94 flammability test, the average burning time of a molded product having a length of 12.6 cm, a width of 1.3 cm and a thickness of 1.6 mm formed of the flame retardant resin composition before and after the aging processing in which the molded product is left to stand at 150° C. for 1000 hours under the atmospheric pressure is within 10 seconds, and the change rate of chloroform-insoluble component before and after the aging processing is 15 mass % or less.

[2] The flame retardant resin composition according to [1] in which the polyphenylene ether includes at least one structural unit selected from a group consisting of the following formulae (1), (2) and (3).

[Formula 1]

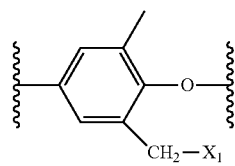

(1)

[Formula 2]

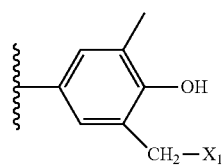

(2)

(where $X_1$ in formulae (1) and (2) is one group selected from the following formulae,

[Formula 3]

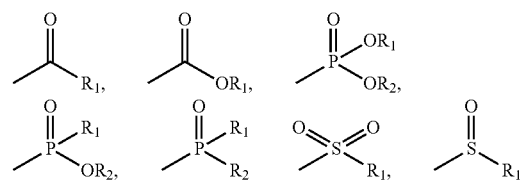

and $R_1$ and $R_2$ in $X_1$ are each independently a substituent having a carbon number of at least 1, and

[Formula 4]

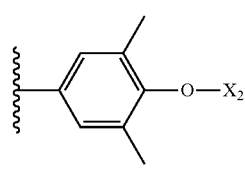

(3)

(where $X_2$ in formula (3) is one group selected from the following formulae,

[Formula 5]

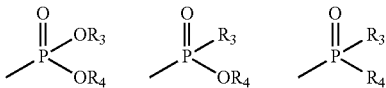

and $R_3$ and $R_4$ in $X_2$ are each independently a group selected from a group consisting of a hydrogen atom, an alkyl group, an aryl group, an alkylamino group and an arylamino group, and $R_3$ and $R_4$ may form a cyclic structure through bonding of carbon atoms contained therein, with the proviso that formula (3) does not substantially have a carbon-carbon double bond other than a double bond of aromatic ring.)

[3] The flame retardant resin composition according to [2] in which the polyphenylene ether includes the structural unit represented by the formulae (1) and/or (2) and the structural unit represented by the formula (3).

[4] The flame retardant resin composition according to [2] or [3], in which $X_1$ in the formulae (1) and (2) is one group selected from the following formulae,

[Formula 6]

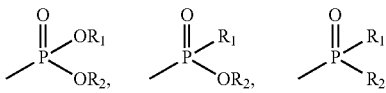

where $R_1$ and $R_2$ in $X_1$ are each independently a substituent having a carbon number of at least 1.

[5] The flame retardant resin composition according to any one of [2] to [4] in which the polyphenylene ether has 0.01 to 10 units of any structural unit selected from a group consisting of the formulae (1), (2) and (3) per 100 units of monomer unit constituting the polyphenylene ether, and mole percent of the structural unit represented by the formula (1) with respect to the structural unit represented by the formula (2) is 0 to 30 mol %.

[6] The flame retardant resin composition according to any one of [1] to [5], further containing (B) condensed phosphate ester-based flame retardant.

[7] The flame retardant resin composition according to [6], containing 0.1 to 40 parts by mass of (B) condensed phosphate ester-based flame retardant per 100 parts by mass of the polyphenylene ether.

[8] The flame retardant resin composition according to any one of [1] to [7], further containing (C) condensed phosphate metal salt.

[9] The flame retardant resin composition according to [8], containing 0.1 to 5.0 parts by mass of (C) condensed phosphate metal salt per 100 parts by mass of the polyphenylene ether.

[10] The flame retardant resin composition according to any one of [1] to [9] further containing (D) antioxidant, in which the (D) antioxidant content is 0.1 to 5.0 parts by mass per 100 parts by mass of the polyphenylene ether.

[11] The flame retardant resin composition according to any one of [1] to [10] in which the number average molecular weight of the polyphenylene ether is at least 10,000.

According to this disclosure, a flame retardant resin composition excellent in flame retardance, and surface smoothness, appearance, flame retardance and electrical properties after a long term thermal aging (e.g. 15° C., 500 hours or more) can be provided while maintaining mechanical/electrical properties.

DETAILED DESCRIPTION

The following provides a detailed description of an embodiment (hereinafter referred to also as "this embodiment") of the flame retardant resin composition according to this disclosure. Note that this disclosure is not limited to the following embodiment and various modifications may be made without departing from the gist of this disclosure.

The flame retardant resin composition according to this embodiment contains a polyphenylene ether, and preferably, based on UL94 flammability test, the average burning time of a molded product having a length of 12.6 cm, a width of 1.3 cm and a thickness of 1.6 mm formed of the flame retardant resin composition before and after the aging processing in which the molded product is left to stand at 150° C. for 1000 hours under the conditions of atmospheric pressure is within 10 seconds, and the change rate of chloroform-insoluble component before and after the aging processing is 15 mass % or less. By the use of the flame retardant resin composition containing a polyphenylene ether according to this embodiment, a molded product formed of the resin composition may preferably have practically favorable mechanical properties, electrical properties and high molding fluidity, and suppress a decrease in surface smoothness, flame retardance and electrical properties when exposed to high temperature environment over a long period of time.

The above described physical properties can be achieved by suppressing the deterioration of polyphenylene ether even if the resin composition is exposed to a high temperature environment over a long period of time. Examples of means of suppressing deterioration of polyphenylene ether may include, but not particularly limited to, for example, modifying an oxidized area such as terminal and/or side chain of PPE with a specific reactive compound and containing a specific amount of compound that can suppress degradation of PPE, or the like.

The flame retardant resin composition according to this embodiment may contain, in addition to a polyphenylene ether, (B) condensed phosphate ester-based flame retardant, (C) condensed phosphate metal salt, (D) antioxidant and (E) other materials.

Preferably, as described later, according to this embodiment, in the flame retardant resin composition, the polyphenylene ether is preferably a modified PPE containing at least one structural unit selected from a group consisting of formulae (1), (2) and (3).

The following describes each component that can be used in this embodiment in detail.

((A) Thermoplastic Resin)

Preferably, the flame retardant resin composition according to this embodiment includes (A) thermoplastic resin containing a polyphenylene ether.

Preferably, (A) thermoplastic resin contains (A-1) polyphenylene ether, and optionally contains (A-2) other thermoplastic resins and (A-c) compatibilizer.

In terms of obtaining a better long term thermal aging property, as a morphology of the flame retardant resin composition according to this embodiment, preferably, a phase containing (A-1) polyphenylene ether forms a continuous phase. The above described phase containing (A-1) polyphenylene ether may be a phase consisting of (A) polyphenylene ether. This morphology can be observed with a transmission electron microscope by using a known stain, for example, and can be observed by using the method described in the Example below.

((A-1) Polyphenylene Ether)

(A-1) Polyphenylene ether used for the flame retardant resin composition according to this embodiment is a homopolymer, a copolymer or a modification thereof having a repeating unit (structural unit) represented by the following formula (4) and/or formula (5).

[Formula 7]

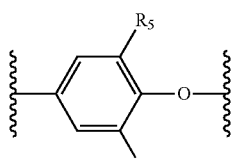

(4)

[Formula 8]

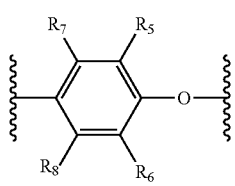

(5)

(In formulae (4) and (5), $R_5$, $R_6$, $R_7$, and $R_8$ each independently represent a hydrogen atom, a $C_1$-$C_4$ alkyl group, a $C_6$-$C_9$ aryl group, or a halogen atom, with the proviso that $R_5$ and $R_6$ are not simultaneously a hydrogen atom.)

The polyphenylene ether may be used alone or in a combination of two or more.

Typical examples of homopolymer of polyphenylene ether include poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloroethyl-1,4-phenylene)ether, poly(2-methyl-6-hydroxyethyl-1,4-phenylene)ether, poly(2-methyl-6-chloroethyl-1,4-phenylene)ether or the like.

The polyphenylene ether copolymer is a copolymer in which the repeating unit represented in the above described formula (4) and/or formula (5) is the main repeating unit.

Examples of the copolymer include a copolymer of 2,6-dimethylphenol and 2,3,6-trimethylphenol, a copolymer of 2,6-dimethylphenol and o-cresol, a copolymer of 2,6-dimethylphenol and 2,3,6-trimethylphenol and o-cresol, or the like.

Among the above described polyphenylene ethers, poly(2,6-diethyl-1,4-phenylene)ether is preferable.

Preferably, the above described polyphenylene ether includes at least a structure unit represented by formula (4) in which $R_5$ and $R_6$ in the above described formula (4) are respectively a methyl group (as described below, any structure derived from this structure is included).

In the polyphenylene ether, the terminal OH group concentration is preferably 0.6 to 10.0 pieces, and more preferably 1.0 to 1.8 pieces per 100 units of monomer unit constituting the polyphenylene ether.

Note that the terminal OH group concentration of PPE can be calculated based on NMR measurement.

The reduced viscosity (unit: dL/g, chloroform solution, measured at 30° C.) of the above described polyphenylene ether is preferably in the range of 0.25 to 0.6, and more preferably in the range of 0.35 to 0.55.

Further, the number average molecular weight (Mn) is preferably 10,000 or more and more preferably 14,000 or more, and preferably 20,000 or less and more preferably 19,000 or less. When the number average molecular weight is within these molecular weight ranges, a composition having an excellent balance of flame retardance, fluidity and adhesion to filler can be provided.

The above described polyphenylene ether can generally be obtained as powder, and the particle size thereof based on weight average particle diameter is preferably 1 to 1000 jam, more preferably 10 to 700 jam, and particularly preferably 100 to 500 am. In terms of ease of handling during processing, 1 jam or more is preferable, and 1000 jam or less is preferable to prevent occurrence of unmelted particles after melting and kneading.

In this specification, the weight average particle diameter is a value obtained from calculation of 50% diameter of the weight accumulation particle size distribution after sieving the particles with a micro-electromagnetic vibrating sieve (10-stage mesh with opening from 1,700 jam to 46 jam) for 30 minutes.

Preferably, the above described polyphenylene ether is a modified polyphenylene ether (which may be referred herein as "modified PPE"). In terms of obtaining a flame retardant resin composition more excellent in surface smoothness, appearance, flame retardance and electrical properties after a long-term aging, the modified PPE may be preferably one group selected from the following formulae (1), (2) and (3),

[Formula 9]

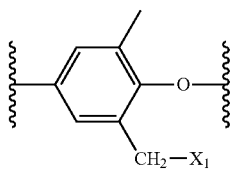

(1)

[Formula 10]

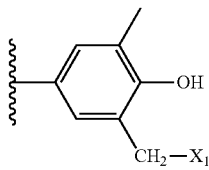

(2)

(where $X_1$ in formulae (1) and (2) is one group selected from the following formulae,

[Formula 11]

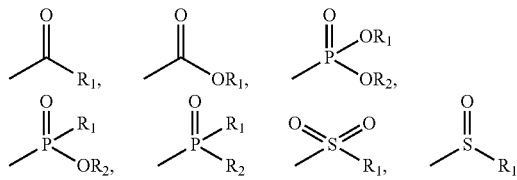

where $R_1$ and $R_2$ in $X_1$ are each independently a substituent having a carbon number of at least 1),

[Formula 12]

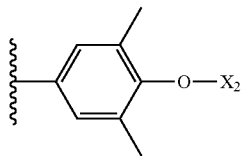

(3)

(where $X_2$ in (3) is a group selected from the following formulae,

[Formula 13]

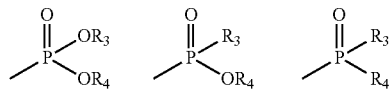

$R_3$ and $R_4$ in $X_2$ are each independently a group selected from a group consisting of a hydrogen atom, an alkyl group, an aryl group, an alkylamino group and an arylamino group, and $R_3$ and $R_4$ may form a cyclic structure through bonding of carbon atoms contained therein, with the proviso that formula (3) does not substantially include a carbon-carbon double bond other than an unsaturated double bond of aromatic ring). Further, more preferably, the $X_1$ in formulae (1) and (2) is one group selected from the following formulae,

[Formula 14]

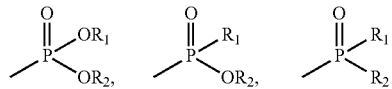

(wherein $R_1$ and $R_2$ in $X_1$ are each independently a substituent having a carbon number of at least 1).

The above described modified polyphenylene ether may preferably be a polyphenylene ether including the structural unit represented by the above described formula (1) and/or formula (2) and the structural unit represented by the above described formula (3).

The structure of $R_1$ and $R_2$ in $X_1$ may preferably be a substituent having no reactive functional group. When $R_1$ and $R_2$ have reactive substituents, these reactive substituents cause crosslinking reaction when a resin composition is exposed to high temperatures over a long period of time, which may deteriorate physical properties after aging. Examples of reactive substituent include a hydroxyl group, an alkoxy group, an amino group, a vinyl group, a carbonyl group, or the like. Further, examples of the structure of $R_1$ and $R_2$ include a structure in which $R_1$ and $R_2$ are coupled (e.g. a cyclic structure in which carbon atoms included in $R_1$ and $R_2$ are bonded to each other (with the proviso that, other than double bond of aromatic ring, carbon-carbon-double bond is not substantially included)) and a structure in which nitrogen atoms and oxygen atoms are included.

Examples of $R_1$ and $R_2$ include, for example, a chain or cyclic alkyl group or aryl group having a carbon number of 1 to 30, and specifically include a methyl group, an ethyl group, an n-propyl group, an i-propyl group, an n-butyl group, a t-butyl group, a hexyl group, a cyclohexyl group, an octyl group, a decyl group, a dodecyl group, a hexadecyl group, an octadecyl group, a phenyl group, a tolyl group, a naphtyl group, or the like.

As $R_3$ and $R_4$ in $X_2$, an alkyl group, an aryl group and an alkylamino group having no carbon-carbon double bond excepting aromatic ring is preferable, and a structure in which two substituents are coupled and a structure in which nitrogen atoms and oxygen atoms are included may be used.

Examples of the alkyl group in $R_3$ and $R_4$ include, for example, an alkyl group having a carbon number of 1 to 30, and specifically include a methyl group, an ethyl group, an n-propyl group, an i-propyl group, an n-butyl group, a t-butyl group, a hexyl group, a cyclohexyl group, an octyl group, a decyl group, a dodecyl group, a hexadecyl group, an octadecyl group, or the like.

Further, examples of an aryl group in $R_3$ and $R_4$ include, for example, an aryl group having a carbon number of 6 to 30, and specifically include a phenyl group, a tolyl group, a dimethylphenyl group, a trimethylphenyl group, a naphtyl group, a trityl group, or the like.

Moreover, examples of an alkyl group of the above described alkylamino group include, for example, an alkyl group having a carbon number of 1 to 30, and specifically include a methyl group, an ethyl group, an n-propyl group, an i-propyl group, a butyl group, a hexyl group, a cyclohexyl group, an octyl group, a decyl group, a dodecyl group, a hexadecyl group, an octadecyl group, or the like, Further, examples of the above described alkylamino group include a methylamino group, a dimethylamino group, an ethylamino group, a dietylamino group, an isopropylamino group, a diisopropylamino group, a butylamino group, a dibutylamino group, an octylamino group, a dioctylamino group, or the like.

Further, examples of an aryl group of the above described arylamino group include the same groups as described above, and specifically, include a phenylamino group, a diphenylamino group, a tolylamino group, a ditolylamino group, a dimethylphenylamino group, a trimethylphenylamino group, a naphtylamino group, a tritylamino group, or the like.

Preferably, the modified PPE having a structural unit represented by formula (3) does not substantially have carbon-carbon double bond other than an unsaturated double bond of aromatic ring in the terminal structural unit represented by formula (3). Among them, preferably, the modified PPE does not substantially have a carbon-carbon double bond other than an unsaturated double bond of aromatic ring in a polyphenylene ether. The carbon-carbon double bond structure has a high thermal reactivity, and when the structure is exposed to high temperatures over a long period of time, the carbon-carbon double bond causes an intermolecular or intramolecular crosslinking reaction, which may lead to a decrease in thermal aging resistance properties.

The number of carbon-carbon double bonds other than aromatic ring can be measured from a doublet peak, that is different from a precursor polyphenylene ether, appeared in 3.5 to 5.5 ppm based on $^1$H-NMR method measured under the conditions described later in Examples. Note that, when the number of carbon-carbon double bond other than aromatic ring is 0.01 pieces or more per 100 units of monomer unit constituting (A) polyphenylene ether, the number can be detected based on $^1$H-NMR method measured under the conditions described later in Examples.

The "not substantially have carbon-carbon double bond other than an unsaturated double bond of aromatic ring in the terminal structural unit represented in formula (3)" means that no doublet peak different from the precursor polyphenylene ether is not detected in 3.5 to 5.5 ppm based on $^1$H-NMR measured under the conditions described later in Examples.

In the above described modified PPE, in terms of obtaining better surface smoothness, appearance, flame retardance and electrical properties after long-term thermal aging (e.g. at 150° C., 500 hours or more), preferably, the number of any structural unit selected from a group constituting of formulae (1), (2) and (3) is in the range of 0.01 to 10 units per 100 units of monomer unit constituting a polyphenylene ether, and the mole percent of the structural unit represented by formula (1) with respect to the structural unit represented by formula (2) (mole of the structural unit represented by formula (1)/mole of the structural unit represented by formula (2)×100) is 0 to 30 mol %. Among them, the number of any structural unit selected from a group consisting of formulae (1), (2) and (3) per 100 units of monomer unit constituting a polyphenylene ether is preferably 0.03 to 5.0 units, and more preferably 0.03 to 3.0 units. Further, preferably, the mole percent of the structural unit represented by formula (1) with respect to the structural unit represented by formula (2) is 0 to 27 mol %.

Preferably, the above described modified PPE contains 0.1 to 10.0 units of structural unit represented by formula (1) and/or formula (2) and/or 0.01 to 5.0 units of structural unit represented by formula (3) per 100 units of monomer unit constituting a polyphenylene ether. When the number is set within the above described ranges, the thermal aging resistance can be improved without degrading mechanical properties.

The number of structural units represented by formula (1) and/or formula (2) per 100 units of monomer unit constituting a polyphenylene ether is preferably in the range of 0.1 to 3.0 units and more preferably in the range of 0.1 to 1.0 units.

The number of structural units represented by formula (3) per 100 units of monomer unit constituting a polyphenylene ether is preferably in the range of 0.01 to 3.0 units and more preferably in the range of 0.01 to 1.0 units.

In the above described modified PPE, the terminal OH group concentration is preferably 0.1 to 2.0 pieces and more preferably 0.1 to 1.0 pieces per 100 units of monomer unit constituting a modified polyphenylene ether.

Note that the terminal OH concentration of the modified PPE can be calculated from the NMR measurement, and specific examples of the method are described in Examples.

effect using the modified polyphenylene ether will be described below.

When an unmodified polyphenylene ether is used, when the resin composition is exposed to high temperatures over a long period of time, the methyl group in the terminal unit (hereinafter referred to also as a "terminal methyl group"), the methyl group in the intermediate unit (hereinafter referred to also as a "side chain methyl group") and the hydroxyl group in the terminal unit (hereinafter referred to also as a "terminal hydroxyl group") may cause oxide crosslinking reaction, and the oxide crosslinking reaction may have effects on degradation of thermal aging resistance properties of the polyphenylene ether and resin composition comprising its polyphenylene ether. More specifically, the terminal methyl group, the side chain methyl group and the terminal hydroxyl group are likely to generate radicals, and generated radicals may cause oxidation crosslink. In the modified polyphenylene ether, oxidized areas such as a terminal methyl group, a side chain methyl group and a terminal hydroxyl group are sealed in a state where they are replaced with specific molecules, and thus cross-linking reaction of terminal methyl group, side chain methyl group and terminal hydroxyl group can be suppressed, and as a result, thermal aging resistance properties of polyphenylene ether can be further improved. Further, in the modified polyphenylene ether, the terminal methyl group, the side chain methyl group and the terminal hydroxyl group are sealed in a state where they are replaced with specific molecules, and thus the structural change of the terminal (terminal methyl group, side chain methyl group, terminal hydroxyl group) in the molecular chain can be further suppressed when the resin composition using the modified PPE is in an extruder or a molding machine, and as a result, the thermal aging resistance properties can be further improved, staining of a molded product can be further prevented, and appearance can be further improved. The terminal methyl group and the terminal hydroxyl group have a larger radical potency of the oxidized area than the side chain methyl group, and thus, preferably, sealing with predetermined molecules may be applied more to the terminals.

<Method of Synthesizing Modified Polyphenylene Ether>

Preferably, the modified PPE is obtained by reacting, for example, a precursor polyphenylene ether (herein may be referred to as a "precursor PPE") with a reactive compound by heat.

Examples of precursor PPE include a homopolymer or a copolymer having repeating unit (structural unit, monomer unit) represented by the above described formula (4) and/or formula (5).

Examples of homopolymer of precursor PPE are the same as those of the above described polyphenylene ether. Examples of copolymer of precursor PPE are the same as those of the above described polyphenylene ether. Among others, a copolymer of 2,6-dimethylphenol and 2,3,6-trimethylphenol and a copolymer of 2,6-dimethylphenol and o-cresol are preferable.

Preferably, the structure of formula (3) is obtained by reacting a polyphenylene ether terminal OH with a reactive compound.

As a precursor PPE, a precursor polyphenylene ether having a terminal group and/or a side chain group represented by formulae (6) and (7) in a polyphenylene ether chain is preferable.

When the precursor PPE has the structural unit of formula (6) and/or formula (7), a modified polyphenylene ether can be obtained with great efficiency (specifically, in order to produce a modified PPE, the CH$_2$—Y portion in the structure of formulae (6) and (7) is selectively cleaved and a substitution reaction with the reactive compound described below occurs, and thus a modified PPE can be obtained with great efficiency). Further, a precursor PPE can be easily synthesized from an unsubstituted PPE, and thus a modified PPE synthesis via the precursor PPE is efficient.

Moreover, preferably, in a polyphenylene ether, the precursor PPE may include 0.1 to 10 units of structural unit in total per 100 units of monomer unit constituting a polyphenylene ether.

[Formula 15]

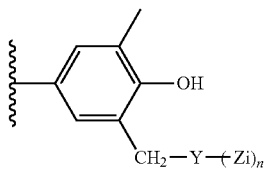

(6)

[Formula 16]

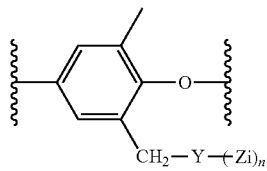

(7)

(In formulae (6) and (7), Y represents N atom or O atom, and $Z_1$ represents a cyclic or chain (straight-chain, branched) saturated or unsaturated hydrocarbon group having a carbon number of 1 to 20. Further, in the formulae, i and n are an integer from 1 to 2, and $Z_1$ and $Z_2$ may be the same or different, and $Z_1$ and $Z_2$ may be bonded to each other together with Y to form a cyclic structure.)

Examples of production method of precursor polyphenylene ether containing a structural unit according to formulae (6) and (7) may include, but not particularly limited to, for example, a method in which (a1) compound such as amines, alcohols and morpholines are added for reaction during a polymerization reaction of polyphenylene ether and a method in which a polymerized unsubstituted polyphenylene ether is stirred at 20 to 60° C., preferably at 40° C. in a PPE dissolving solvent such as toluene, for example, and the above described (a1) compound is added for reaction.

Examples of (a1) compound may include, but not particularly limited to primary amines such as n-propylamine, iso-propylamine, n-butylamine, iso-butylamine, sec-butylamine, n-hexylamine, n-octylamine, 2-ethylhexylamine, cyclohexylamine, laurylamine and benzylamine, secondary amines such as diethylamine, di-n-propylamine, di-n-butylamine, di-iso-butylamine, di-n-octylamine, piperidine and 2-pipecholine, alcohols such as methanol, ethanol, n-propanol, iso-propanol, n-butanol, iso-butanol and sec-butanol, and morpholines or the like.

Examples of method of obtaining a modified polyphenylene ether may include, but not particularly limited to, for example, a method in which a reactive compound described later is added during polymerization of polyphenylene ether to polymerize a modified polyphenylene ether, a method in which a small amount of monomer substituted by the reactive compound described later is added during polymerization of polyphenylene ether to polymerize a modified polyphenylene ether, and a method in which a polyphenylene ether and a reactive compound are melted and kneaded for reaction. Specifically, examples of method include a method in which the above described (a1) compound is added for reaction during PPE polymerization and after that, a reactive compound described later is added for reaction, a method in which a small amount of 2,6-dimethylphenol substituted by (a1) compound is added for reaction during PPE polymerization, and a method in which, after obtaining a precursor PPE, the precursor PPE and a reactive compound are melted and kneaded for reaction (i.e. a precursor PPE and a reactive compound are melted and kneaded when a resin composition is produced by melting and kneading by using a precursor PPE). Among them, in terms of an efficient reaction in a short period of time, a method in which, after a precursor PPE is obtained, the precursor PPE and a reactive compound are melted and kneaded for reaction is preferable.

As a method of melting and kneading a precursor PPE and a reactive compound, a method of melting and kneading with an extruder such as a single-screw extruder and a multi-screw extruder such as a twin-screw extruder is preferable (a twin-screw extruder is preferable). In order to increase reactivity of reactive compound with polyphenylene ether, preferably, these two substances are previously blended and put from the same feeder.

In terms of an efficiency of the reaction with the reactive compound, an efficiency of extrusion of modified PPE and mechanical property of PPE-based resin composition, the resin temperature during melting and kneading is preferably 240 to 360° C., and more preferably 270 to 350° C.

In term of an efficiency of reaction with the reactive compound and less possibility of resin deterioration, L/D of an extruder during melting and kneading is preferably 40 to 70 and a total L/D of kneading zone is preferably 10 to 20.

In terms of kneading stability of raw material, the number of rotation of extruder screw during melting and kneading is preferably 150 to 600 rpm, and more preferably 250 to 450 rpm.

In terms of securing the reaction time with reactive compound and less possibility of resin deterioration, the residence time of resin during melting and kneading is preferably 30 to 120 seconds, and more preferably 35 to 80 seconds.

(Reactive Compound)

Examples of reactive compound that can be used to obtain the above described modified polyphenylene ether may include, but not particularly limited to phosphonic acids, phosphonic acid esters, phosphinic acids, phosphinic acid esters, monocarboxylic acids, sulfonic acids, sulfinic acids, carbonates, or the like.

Examples of phosphonic acids include, for example, phosphonic acid (phosphorous acid), methylphosphonic acid, ethylphosphonic acid, vinyl phosphonic acid, decylphosphonic acid, phenylphosphonic acid, benzylphosphonic acid, aminomethylphosphonic acid, methylenediphosphonic acid, 1-hydroxyethane-1,1-diphosphonic acid, 4-methoxyphenylphosphonic acid, propylphosphonic acid anhydride, or the like.

Examples of phosphonic acid esters include, for example, phosphonic acid dimethyl, phosphonic acid diethyl, phosphonic acid bis (2-ethylhexyl), phosphonic acid dioctyl, phosphonic acid dilauryl, phosphonic acid dioleoyl, phosphonic acid diphenyl, phosphonic acid dibenzyl, methylphosphonic acid dimethyl, methylphosphonic acid diphenyl, methylphosphonic acid dioctyl, ethylphosphonic acid diethyl, ethylphosphonic acid dioctyl, benzylphosphonic acid diethyl, phenylphosphonic acid dimethyl, phenylphosphonic acid diethyl, phenylphosphonic acid dipropyl, phenylphosphonic acid dioctyl, (methoxymethyl) phosphonic acid diethyl, (methoxymethyl) phosphonic acid dioctyl, vinylphosphonic acid diethyl, hydroxymethylphosphonic acid diethyl, (2-hydroxyethyl)phosphonic acid dimethy, (methoxymethyl) phosphonic acid dioctyl, p-methylbenzyl phosphonic acid diethyl, p-methylbenzyl phosphonic acid dioctyl, diethylphosphonoacetate, diethylphosphonoacetate ethyl, diethylphosphonoacetate tert-butyl, diethylphosphonic acid dioctyl, (4-chlorobenzyl)phosphonic acid diethyl, (4-chlorobenzyl)phosphonic acid dioctyl, cyanophosphonic acid diethyl, cyanomethylphosphonic acid diethyl, cyanophosphonic acid dioctyl, 3,5-di-tert-butyl-4-hydroxybenzylphosphonic acid diethyl, 3,5-di-tert-butyl-4-hydroxybenzylphosphonic acid dioctyl, (methylthiomethyl)phosphonic acid diethyl or the like.

Examples of phosphinic acids include, for example, dimethyl phosphinic acid, ethylmethyl phosphinic acid, diethyl phosphinic acid, methyl-n-propyl phosphinic acid, diphenyl phosphinic acid, dioleyl phosphinic acid, 9,10-dihydro-9-oxa-10-phosphaosphenanthrene-10-oxide and derivatives thereof.

Examples of phosphinic acid esters include, for example, dimethylphosphinic acid methyl, dimethylphosphinic acid ethyl, dimethylphosphinic acid n-butyl, dimethylphosphinic acid cyclohexyl, dimethylphosphinic acid vinyl, dimethylphosphinic acid phenyl, ethylmethylphosphinic acid methyl, ethylmethylphosphinic acid ethyl, ethylmethylphosphinic acid n-butyl, ethylmethylphosphinic acid cyclohexyl, ethylmethylphosphinic acid vinyl, ethylmethylphosphinic acid phenyl, diethylphosphinic acid methyl, diethylphosphinic acid ethyl, diethylphosphinic acid n-butyl, diethylphosphinic acid cyclohexyl, diethylphosphinic acid vinyl, diethylphosphinic acid phenyl, diphenylphosphinic acid methyl, diphenylphosphinic acid ethyl, diphenylphosphinic acid n-butyl, diphenylphosphinic acid cyclohexyl, diphenylphosphinic acid vinyl, diphenylphosphinic acid phenyl, methyl-n-propylphosphinic acid methyl, methyl-n-propylphosphinic acid ethyl, methyl-n-propylphosphinic acid n-butyl, methyl-n-propylphosphinic acid cyclohexyl, methyl-n-propylphosphinic acid vinyl, methyl-n-propylphosphinic acid phenyl, dioleylphosphinic acid methyl, dioleylphosphinic acid ethyl, dioleylphosphinic acid n-butyl, dioleylphosphinic acid cyclohexyl, dioleylphosphinic acid vinyl, dioleylphosphinic acid phenyl, or the like.

Examples of monocarboxylic acids include monocarboxylic acid such as formic acid, acetic acid, propionic acid, butyric acid, hexanoic acid, heptanoic acid, octanoic acid, nonanoic acid, decanoic acid, dodecanoic acid, tetradecanoic acid, octadecanoic acid, docosanoic acid, hexacosanoic acid, octadecenoic acid, docosenoic acid and iso-octadecanoic acid, alicyclic monocarboxylic acid such as cyclohexanecarboxylic acid, aromatic monocarboxylic acid such as benzoic acid and methyl benzene carboxylic acid, hydroxy aliphatic monocarboxylic acid such as hydroxypropionic acid, hydroxyoctadecanoic acid and hydroxyoctadecene acid, and sulfur-containing aliphatic monocarboxylic acid such as alkylthiopropionic acid, or the like.

Examples of sulfonic acid include, for example, alkylsulfonic acid, benzenesulfonic acid, naphthalenesulfonic acid, anthraquinonesulfonic acid, camphorsulfonic acid and derivatives thereof. These sulfonic acids may be any one of monosulfonic acid, disulfonic acid and tri-sulfonic acid. Examples of derivatives of benzenesulfonic acid include phenolsulfonic acid, styrenesulfonic acid, toluenesulfonic acid, dodecylbenzenesulfonic acid, or the like. Examples of derivatives of naphthalenesulfonic acid include 1-naphthalenesulfonic acid, 2-naphthalenesulfonic acid, 1,3-naphthalene disulfonic acid, 1,3,6-naphthalene trisulfonic acid, 6-ethyl-1-naphthalene sulfonic acid or the like. Examples of derivative of anthraquinonesulfonic acid include anthraquinone-1-sulfonic acid, anthraquinone-2-sulfonic acid, anthraquinone-2,6-disulfonic acid, 2-methyl anthraquinone-6-sulfonic acid, or the like.

Examples of sulfinic acid include alkane sulfinic acids such as ethane sulfinic acid, propanoic sulfinic acid, hexane sulfinic acid, octanoic sulfinic acid, decanoic sulfinic acid and dodecanoic sulfinic acid, alicyclic sulfinic acid such as cyclohexanesulfinic acid and cyclooctanesulfinic acid, aromatic sulfinic acids such as benzenesulfinic acid, o-toluenesulfinic acid, p-toluenesulfinic acid, ethylbenzenesulfinic acid, decylbenzenesulfinic acid, dodecylbenzenesulfinic acid, chlorobenzenesulfinic acid, and naphthalenesulfinic acid, or the like.

Examples of carbonates include, for example, dimethyl carbonate, diethyl carbonate, diisopropyl carbonate, dibutyl carbonate, dihexyl carbonate, dioctyl carbonate, diphenyl carbonate, methylethyl carbonate, methylphenyl carbonate, ethylphenyl carbonate, butylphenyl carbonate, ditolyl carbonate, or the like.

In terms of efficiency of the reaction, a phosphorus-based compound is preferable as a reactive compound, and examples thereof include phosphonic acid diphenyl, phosphonic acid dioleyl, phosphonic acid dioctyl, phosphonic acid diphenyl, phosphonic acid dioleyl, or the like. Among them, 9, 10-dihydro-9-oxa-10-phosphaphenanthrene-10-oxide is more preferable. The modified PPE obtained by using 9,10-dihydro-9-oxa-10-phosphaphenanthrene-10-oxide can improve the thermal aging resistance property, and further can improve the fluidity when the resin composition using the PPE is melted and kneaded.

In formulae (4) and (5) of (A) polyphenylene ether, at least one group selected from a group consisting of the above described $R_5$, $R_6$, $R_7$ and $R_8$ may be a group represented by —$CH_2$—Y-$(Zi)_n$ in formula (6) or (7), and in particular, may preferably be a structure represented by formulae (6) or (7).

In terms of obtaining more excellent thermal resistance, electrical properties, size stability, impact resistance, low specific gravity or the like, the polyphenylene ether content in the flame retardant resin composition according to this embodiment is preferably 50 to 95 parts by mass, and more preferably 60 to 85 parts by mass per 100 parts by mass of flame retardant resin composition.

Further, in terms of obtaining more excellent thermal resistance, electrical properties, size stability, impact resistance, low specific gravity or the like, the polyphenylene ether content in (A) thermoplastic resin is preferably 50 to 95 parts by mass, and more preferably 60 to 85 parts by mass per 100 parts by mass of thermoplastic resin.

((A-2) Other Thermoplastic Resins)

Examples of (A-2) other thermoplastic resins used in this embodiment may include, but not particularly limited to thermoplastic resins other than polyphenylene ether, and specifically may include (A-2-1) polystyrene-based resin, (A-2-2) polyamide resin, (A-2-3) polypropylene resin, or the like. The other thermoplastic resins may be used alone or in a combination of two or more.

(A-2-1) Polystyrene-Based Resin

The polystyrene resin used in this embodiment is a homopolymer of styrene and styrene derivative, and a copolymer composed mainly of styrene and styrene derivative. Examples of styrene derivative may include, but not particularly limited to o-methylstyrene, m-methylstyrene, p-methylstyrene, t-butylstyrene, α-methylstyrene, β-methylstyrene, diphenylethylene, chlorostyrene, bromostyrene, or the like.

Examples of homopolymer polystyrene-based resin include, for example, polystyrene, poly α-methylstyrene, poly chlorostyrene or the like.

Examples of copolymer polystyrene-based resin may include, but not particularly limited to styrene-butadiene copolymer, styrene-acrylonitrile copolymer, styrene-maleic acid copolymer, styrene-maleic anhydride copolymer, styrene-maleimide copolymer, styrene-N-phenylmaleimide copolymer, styrene-N-alkylmaleimide copolymer, styrene-N-alkyl substituted phenylmaleimide copolymer, styrene-acrylic acid copolymer, styrene-methacrylic acid copolymer, styrene-methylacrylate copolymer, styrene-methylmethacrylate copolymer, styrene-n-alkylacrylate copolymer, styrene-n-alkylmethacrylate copolymer and ethylvinylbenzene-divinylbenzene copolymer, in addition, include tetracopolymer such as ABS, butadiene-acrylonitrile-α-methylbenzene copolymer, and further include graft copolymer such as styrene graft polyethylene, styrene graft ethylene-vinyl acetate copolymer, (styrene-acrylic acid) graft polyethylene, styrene graft polyamide, or the like.

These may be used alone or in combination of two or more thereof.

The (A-2-1) polystyrene-based resin content in a flame retardant resin composition is preferably 10 to 100 parts by mass, and more preferably 20 to 70 parts by mass per 100 parts by mass of polyphenylene ether.

(A-2-2) Polyamide-Based Resin

As a polyamide-based resin used by this embodiment, any resin having an amide bond [—NH—C(=O)—] in a repeating unit (structural unit) of polymer may be used.

In general, polyamide can be obtained from ring-opening polymerization of lactams, polycondensation of diamine and dicarboxylic acid, polycondensation of aminocarboxylic acid or the like, but not limited thereto.

Examples of diamine fall roughly into aliphatic, alicyclic and aromatic diamines, and specific examples thereof include tetramethylenediamine, hexamethylenediamine, nonamethylenediamine, undecamethylenediamine, dodecamethylenediamine, tridecamethylenediamine, 2-methyl-1,8-octamethylenediamine, 2,2,4-trimethylhexamethylenediamine, 2,4,4-trimethylhexamethylenediamine, 5-methylnanomethylenediamine, 1,3-bis-aminomethylcyclohexane, 1,4-bis-aminomethylcyclohexane, m-phenylenediamine, p-phenylenediamine, m-xylylenediamine, p-xylylenediamine, or the like.

Examples of dicarboxylic acid fall roughly into aliphatic, alicyclic and aromatic dicarboxylic acid, and specific examples thereof include adipic acid, suberic acid, azelaic acid, sebacic acid, dodecanedioic acid, 1,1,3-tridecanedioic acid, 1,3-cyclohexanedicarboxylic acid, terephthalic acid, isophthalic acid, naphthalene dicarboxylic acid, dimer acid, or the like.

Specific examples of lactams include s-caprolactam, enantholactam, o-laurolactam, or the like.

Specific examples of aminocarboxylic acid include s-aminocaproic acid, 7-aminoheptanoic acid, 8-aminooctanoic acid, 9-aminonanon acid, 11-aminoundecanoic acid, 12-aminododecanoic acid, 13-aminotridecane acid, or the like.

In this disclosure, any of copolymerized polyamides obtained through polycondensation of each of or a mixture of two or more of these diamine, dicarboxylic acid, lactams and aminocarboxylic acid can be used.

Further, these lactams, diamine, dicarboxylic acid and co-aminocarboxylic acid may be polymerized in a polymerization reactor to a stage of oligomer of low molecular weight and then highly polymerized in an extruder or the like. The resulting product may be favorably used.

Examples of polyamide usefully used in this disclosure include polyamide 6, polyamide 6,6, polyamide 4,6, polyamide 11, polyamide 12, polyamide 6,10, polyamide 6,12, polyamide 6/6,6, polyamide 6/6,12, polyamide 6, MXD (m-xylylenediamine), polyamide 6,T, polyamide 6,1, polyamide 6/6,T, polyamide 6/6,I, polyamide 6,6/6,T, polyamide 6,6/6,I, polyamide 6/6,T/6,I, polyamide 6,6/6,T/6,I, polyamide 6/12/6,T, polyamide 6,6/12/6,T, polyamide 6/12/6,I, polyamide 6,6/12/6,I, polyamide 9,T or the like. Polyamides obtained through copolymerization of a plurality of polyamides in an extruder or the like may be used.

Preferable polyamides are polyamide 6, polyamide 6,6, polyamide 6/6,6 and a mixture thereof, and the most preferable polyamide is polyamide 6,6 alone or a mixture of polyamide 6,6 and polyamide 6.

A preferable content of polyamide 6,6 when a mixture of polyamide 6,6 and polyamide 6 is used as a polyamide is preferably 70 to 99 mass %, and more preferably 85 to 95 mass % with the proviso that the amount of a mixture of all of polyamide 6,6 and polyamide 6 used is 100 mass %.

The preferable viscosity number of polyamide used in this disclosure is preferably 100 to 130 mL/g, and more preferably 110 to 128 mL/g when measured in 96% sulfuric acid in conformance with ISO 307:1994. Use of polyamide having the above described viscosity number may improve a balance between the fluidity and the mechanical property of the resin composition.

The polyamide used in this disclosure may be a mixture of various polyamides each having a viscosity number different from each other. Even if various polyamides are used, the viscosity number of the polyamide mixture is preferably within the above described range. The fact that the polyamide mixture is within the above described viscosity number range can be confirmed by measuring the viscosity number of polyamide mixture mixed at a desired mix ratio.

The (A-2-2) polyamide-based resin content in the resin composition is preferably 10 to 100 parts by mass, and more preferably 20 to 70 parts by mass per 100 parts by mass of (A-1) polyphenylene ether.

(A-2-3) Polypropylene-Based Resin

Examples of polypropylene-based resin used in this embodiment include a crystalline propylene homopolymer, a crystalline propylene-ethylene block copolymer having a crystalline propylene homopolymer part obtained in the first process of polymerization and a propylene-ethylene random copolymer part obtained by copolymerization of propylene, ethylene and/or at least one other α-olefin (e.g. butene-1, hexane-1, or the like) in or after the second process of polymerization, and a mixture of these crystalline propylene homopolymer and crystalline propylene-ethylene block copolymer.

The (A-2-3) polypropylene-based resin content in the flame retardant resin composition is preferably 10 to 100 parts by mass, and more preferably 20 to 70 parts by mass per 100 parts by mass of polyphenylene ether.

(A-c) Compatibilizer

The compatibilizer used in this embodiment may be defined depending on (A-2) and the other thermoplastic resins to be used. The compatibilizer may be used alone or in a combination of two or more.

When (A-2-2) polyamide-based resin is used as (A-2) other thermoplastic resins, preferably, at least one kind of compound having at least one carbon-carbon double or triple bond and at least one carboxyl group, acid anhydride group, amino group, hydroxyl group, or glycidyl group in the molecular structure described in detail in WO01/81473A may be used as (A-c) compatibilizer.

Among these, maleic anhydride, maleic acid, fumaric acid, citric acid and a mixture thereof are preferable, and maleic acid and/or maleic anhydride are particularly preferable. In particular, selecting maleic acid and/or maleic anhydride as a compatibilizer may improve additional properties such as weld strength of the resin composition.

When maleic acid and/or maleic anhydride is selected as a compatibilizer, the above described compound content in the flame retardant resin composition is preferably 0.03 to 0.3 parts by mass, more preferably 0.07 to 0.3 parts by mass, and still more preferably 0.1 to 0.3 parts by mass per 100 parts by mass of polyphenylene ether.

When (A-2-3) polypropylene-based resin is used as (A-2) other thermoplastic resins, a hydrogenated block copolymer (A-c-3) having a specific structure can be used as (A-c) compatibilizer.

The hydrogenated block copolymer is preferably a polymer obtained through hydrogenation of a block copolymer consisting of at least two polymer block A mainly composed of styrene and at least one polymer block B mainly composed of butadiene having 1,2-vinyl bond content of 70 to 90%.

The polymer block B mainly composed of butadiene may be a single polymer block having 1,2-vinyl bond content of butadiene before its hydrogenation of 70 to 90%.

Further, a polymer block B may be mainly composed of butadiene may be a combined polymer block composed of butadiene having both at least one polymer block B1 mainly composed of butadiene having 1,2-vinyl bond content of 70% to 90% before its hydrogenation and at least one polymer block B2 mainly composed of butadiene having 1,2-vinyl bond content of 30% or more to less than 70% before its hydrogenation. The block copolymer having the above described block structure can be represented by "A-B2-B1-A" and be obtained by a known polymerization method in which 1,2-vinyl bond content is controlled based on a feed sequence of each monomer units which are adjusted. The bonding form of butadiene before hydrogenation can be confirmed by using an infrared spectrophotometer, NMR, or the like.

The (A-c-3) hydrogenated block copolymer content in the resin composition is preferably 1 to 100 parts by mass, more preferably 1 to 40 parts by mass, still more preferably 2 to 20 parts by mass and particularly preferably 2 to 10 parts by mass per 100 parts by mass in total of polyphenylene ether and (A-2-3) polypropylene-based resin.

((B) Condensed Phosphate Ester-Based Flame Retardant)

In terms of improved flame retardance, preferably, the flame retardant resin composition according to this embodiment contains (B) condensed phosphate ester-based flame retardant. Any of the condensed phosphate ester generally used as a flame retardant can be used as (B) condensed phosphate ester-based flame retardant.

The condensed phosphate ester-based flame retardant may be used alone or in a combination of two or more.

Examples of (B) condensed phosphate ester-based flame retardant may include, but not particularly limited to, for example, bisphenolA bis(diphenylphosphate), resorcinol bis(diphenylphosphate), resorcinol bis[di(2,6-dimethylphenyl) phosphate], 2,2-bis{4-[bis(phenoxy)phosphoryloxy] phenyl}propane, 2,2-bis{4-[bis (methylphenoxy) phosphoryloxy]phenyl}propane, or the like. Among these, in terms of compatibility with the polyphenylene ether, an aromatic condensed phosphate ester is particularly preferable.

(B) condensed phosphate ester-based flame retardant is commercially available, and examples thereof may include, but not particularly limited to, for example, CR741, CR733S, PX200 and PX202 from DAIHACHI CHEMICAL INDUSTRY CO., LTD, and FP600, FP700 and FP800 from ADEKA CORPORATION.

Preferably, (B) condensed phosphate ester-based flame retardant is a condensed phosphate ester-based compound represented by formulae (8) and (9) shown below.

[Formula 17]

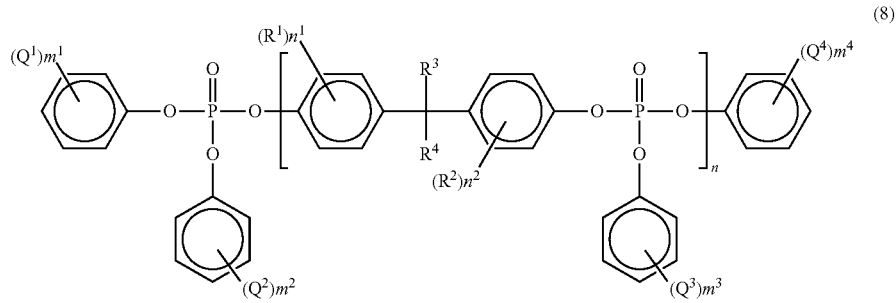

(8)

[Formula 18]

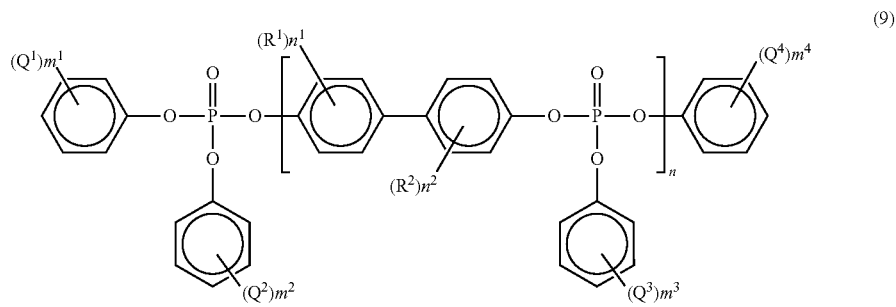

(9)

(In formulae (8) and (9), $Q^1$, $Q^2$, $Q^3$ and $Q^4$ each independently represent an alkyl group having a carbon number of 1 to 6. $R^1$ and $R^2$ represent a methyl group. $R^3$ and $R^4$ each independently represent a hydrogen atom or a methyl group. n is an integer greater than or equal to 1, and $n^1$ and $n^2$ each independently represent an integer of 0 to 2. $m^1$, $m^2$, $m^3$ and $m^4$ each independently represent an integer of 0 to 3.

The (B) condensed phosphate ester-based flame retardant content in the flame retardant resin composition depends on the required flame retardance level, and is preferably 1 to 35 parts by mass, and more preferably 5 to 30 parts by mass per 100 parts by mass of (A) thermoplastic resin. When the content is within the above described range, excellent flame retardance, thermal resistance and impact resistance can be obtained.

Further, the (B) condensed phosphate ester-based flame retardant content in the flame retardant resin composition is preferably 0.1 to 40 parts by mass, and more preferably 1.0 to 20 parts by mass per 100 parts by mass of polyphenylene ether.

((C) Condensed Phosphate Metal Salt)

Examples of (C) condensed phosphate metal salt include, for example, metal salt such as polyphosphoric acid, metaphosphoric acid and ultra phosphoric acid. The condensed phosphate metal salt may be used alone or in a combination of two or more.

As metals in (C) condensed phosphate metal salt, any metals may be used, and alkali metal and alkali-earth metal are preferable, lithium, beryllium, sodium, magnesium, potassium and calcium are more preferable, and sodium, magnesium and potassium are still more preferable. Such metal salt of condensed phosphate has an ease interaction with aromatic compound and a high metal capturing effect, and in addition, has an effect of stabilizing an aldehyde caused by oxidization of a polyphenylene ether, which results in an improved thermal aging resistance effect of resin and flame retardant. Further, the condensed phosphate metal salt serves to suppress a hydrolysis of condensed phosphate ester-based flame retardant, and thus can prevent flame retardant degradation product from bleeding out during molding or thermal aging.

The polymerization degree of condensed phosphate metal salt is not particularly limited, and in a range of polymerization degree of 2 to 50, structures each having the same polymerization degree may be present, or structures each having a different polymerization degree may be mixed. Further, metaphosphoric acid and polyphosphoric acid may be mixed. Moreover, the condensed phosphate metal salt may contain a phosphate metal salt monomer in a range of 0 to 10%.

The condensed phosphate metal salt content is preferably 0.1 to 5.0 parts by mass per 100 parts by mass of polyphenylene ether. When modified polyphenylene ether is used, it is preferably 0.1 to 3.0 parts by mass. When unmodified polyphenylene ether is used, it is preferably 0.3 to 3.0 parts by mass. With this range, both mechanical property and thermal aging resistance can be satisfied.

((D) Antioxidant)

As (D) antioxidant that can be used for the flame retardant resin composition according to this embodiment, both a primary antioxidant serving as a radical chain inhibitor and a secondary antioxidant having a peroxide decomposition effect can be used. That is, by use of an antioxidant, radicals generated in a terminal methyl group, a side chain methyl group or the like can be captured when a polyphenylene ether is exposed to high temperatures over a long period of time (a primary antioxidant), and/or peroxide generated in a terminal methyl group, a side chain methyl group, or the like by the radicals can be decomposed (a secondary antioxidant), and thus an oxidative cross-linking of polyphenylene ether can be prevented.

The oxidant inhibitor may be used alone or in a combination of two or more.

As a primary antioxidant, a hindered phenol-based antioxidant can be mainly used.

Specific examples of hindered phenol-based antioxidant include 2,6-di-t-butyl-4-methylphenol, pentaerythritol-tetrakis-[3-(3,5-di-t-butyl-4-hydroxyphenyl)propionate], n-octadecyl-3-(3,5-di-t-butyl-4-hydroxyphenyl)propionate, 2,2'-methylene-bis(4-methyl-6-t-butylphenol), 2,6-di-t-butyl-4-(4,6-bis(octylthio)-1,3,5-triazin-2-ylamino)phenol, 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 4,4'-butylidenebis(3-methyl-6-t-butylphenol), 4,4'-thiobis(3-methyl-6-t-butylphenol), alkylated bisphenol, tetrakis[methylene-3-(3, 5-di-t-butyl-4-hydroxyphenyl)propionate] methane, and 3,9-bis[2-[3-(3-t-butyl-4-hydroxy-5-methylphenyl)-propionyloxy]-1,1-dimeth ylethyl]-2,4,8,10-tetraoxyspiro[5.5]undecane, or the like.

As a secondary antioxidant, phosphorus-based antioxidant and sulfur-based antioxidant can be mainly used.

Specific examples of phosphorous-based antioxidant include trisnonylphenyl phosphite, triphenyl phosphite, tris (2,4-di-t-butylphenyl)phosphite, bis(2,4-di-t-butylphenyl) pentaerythritol di-phosphite, bis(2,6-di-t-butyl-4-methylphenyl)pentaerythritol-di-phosphite, and 3,9-bis(2,6-di-tert-butyl-4-methylphenoxy)-2,4,8,10-tetraoxa-3,9-diphosphaspiro[5.5]undecane, or the like.

Specific examples of sulfur-based antioxidant include dilauryl-3,3'-thiodipropionate, dimyristyl-3,3'-thiodipropionate, distearyl-3,3'-thiodipropionate, pentaerythritolyl tetrakis(3-laurylthiopropionate), ditridecyl-3,3'-thiodipropionate, 2-mercaptobenzimidazole and 2,6-di-tert-butyl-4-(4, 6-bis(octylthio)-1,3,5-triazine-2-ylamino)phenol, or the like.

Further, as the other antioxidants, a metal oxide or sulfide such as zinc oxide, magnesium oxide and zinc sulfide can also be used together with the above described antioxidants.

Among these, a secondary antioxidant is effective to improve the long-term property of polyphenylene ether resin, and in particular, a phosphorous-based antioxidant is preferable.

The (D) antioxidant content in the retardant resin composition according to this embodiment is preferably 0.1 to 4.0 parts by mass, more preferably 0.1 to 3.0 parts by mass, and still more preferably 0.1 to 1.5 parts by mass per 100 parts by mass of (A) thermoplastic resin.

Further, (D) antioxidant content is preferably 0.1 to 5.0 parts by mass, and more preferably 1.0 to 4.0 parts by mass per 100 parts by mass of polyphenylene ether.

When (D) antioxidant content is in the above described range, the initial flame retardance and the flame retardance after a long-term thermal aging can be further improved, and a flame retardant resin composition having a further improved mechanical strength can be obtained.

((E) Other Materials)

Examples of (E) other materials added as necessary in this disclosure may include, but not limited to inorganic filler (talc, kaolin, xonotlite, wollastonite, titanium oxide, potassium titanate, carbon fibers, glass fibers), known silane coupling agents for improving affinity between the inorganic filler and the resin, plasticizers (low molecular weight polyolefin, polyethylene glycol, fatty acid esters, etc.), coloring agents such as carbon black, conductive imparting material such as carbon fiber, conductive carbon black and carbon fibrils, antistatic agents, peroxides, ultraviolet absorbers, photostabilizers, and release agent such as calcium stearate, montanic acid calcium.

Note that this disclosure includes a flame retardant resin composition that contains (A) thermoplastic resin containing polyphenylene ether. In this case, (A) thermoplastic resin containing polyphenylene ether, (B) condensed phosphate ester-based flame retardant and flame retardant resin composition containing (C) condensed phosphate metal salt are preferable.

When components of (A), (B) and (C) are contained, compatibility between the flame retardance and the thermal aging resistance can be obtained.

Components of (A), (B) and (C) and optional components (D) and (E) are as described above.

[Production Method of Flame Retardant Resin Composition]

The flame retardant resin composition according to this disclosure can be produced by melting and kneading the above described component (A), and further optionally the components (B), (C), (D) and (E) by appropriately adjusting the melting and kneading conditions.

Various melt kneaders and kneading extruder or the like can be used for the production method of the PPE-based resin composition according to this embodiment. A known kneader can be used as a melt kneader and a kneading extruder, and examples thereof include extruders such as a single screw extruder and a multi screw extruder such as a twin screw extruder, a heating and melting kneader such as a roll, a kneader, a Brabender plastograph and a Banbury mixer or the like. Among these, a twin screw extruder is preferable.

Regarding the conditions of melting and kneading (A) and optional components for producing the above described resin composition, preferably, a twin screw extruder having a screw diameter of 25 to 90 mm is used in terms of stably obtaining a large amount of resin composition capable of exhibiting a desired effect of this embodiment.

The extruded resin temperature is preferably 240 to 360° C., more preferably 270 to 350° C., and still more preferably 300 to 340° C. In terms of sufficient reactivity and extrudability, the extruded resin temperature is preferably 240° C. or higher, and in terms of keeping sufficient mechanical property and extrudability, it is preferably 360° C. or lower.

In order to secure a sufficient reaction time, the residence time of the resin composition during melting and kneading is preferably 30 seconds or more and 120 seconds or less, and still more preferably 35 seconds or more and 80 seconds or less. When the residence time is within the above described range, the thermal aging resistance effect can be obtained without promoting resin degradation. Further, when a modified polyphenylene ether is used, a modified polyphenylene ether which reacts a polyphenylene ether with a modified product sufficiently can be easily obtained.

Note that the residence time can be calculated by measuring the time period from the moment at which 0.5 g of black master batch is added from the first raw material feed port of the extruder as a start of measurement to the moment at which a stained strand exits from a mold of the extruder.

Preferably, L/D of the extruder is in the range of 40 to 70, the screw extruder has at least three kneading zones located downstream of the raw material feed port, and L/D of kneading zones is 10 to 20 in total. When the L/D of the extruder and L/D of total kneading zones are within these range, the thermal aging resistance effect can be obtained without promoting resin degradation. Further, when a modified polyphenylene ether is used, a modified polyphenylene ether which reacts a polyphenylene ether sufficiently with a reactive compound can be easily obtained.

In the production method of the flame retardant resin composition according to this embodiment, an extruder having a first raw material feed port, a second raw material feed port, and a liquid adding port is used. When a modified polyphenylene ether is used, in order to increase a reactivity between a reactive compound and a polyphenylene ether, preferably, these materials are previously blended and fed from the same feeder. In particular, in term of obtaining a further improved thermal aging resistance, preferably, (A) component and a reactive compound are fed from the first raw material feed port. Further, in terms of kneadability and degradation suppression of a resin, preferably, (A-2-2) polyamide resin and (A-3-3) polypropylene resin are fed from the second raw material feed port and liquid flame retardant is fed from the liquid adding port.

In terms of kneading stability and reactivity of raw material, the number of screw rotation of the extruder is preferably 150 to 600 rpm, and more preferably 250 to 450 rpm.

Note that, when the resin composition used in this embodiment is produced by using a twin screw extruder (in particular, a large twin screw extruder (screw diameter: 40 to 90 mm)), gel and carbide that may arise from a polyphenylene ether during extrusion may mix into an extrusion resin pellet and cause deterioration of surface appearance and luminance of a molded product. Thus, the polyphenylene ether is fed from the raw material feed port located uppermost stream (top feed) and the oxygen concentration inside the shooter located uppermost stream feed port is set preferably to 15 volume % or less, more preferably to 8 volume % or less, and still more preferably to 1 volume % or less.

The oxygen concentration can be adjusted by sufficiently replacing inside the raw material storage hopper with nitrogen, sealing the feed line extending from the raw material storage hopper to the raw material feed port to prevent the air from flowing into and out of the feed line, and then adjusting the nitrogen feeding amount and gas vent opening.

[Physical Property]

Physical property of the flame retardant resin composition according to this embodiment is described below.

(Change Rate of Chloroform-Insoluble Component)

In the flame retardant resin composition according to this embodiment, in terms of excellent surface smoothness, appearance, flame retardance and electrical properties after a long-term thermal aging (e.g. 150° C., 1000 hours), the change rate of chloroform-insoluble component of a molded product formed of a flame retardant resin composition and having a length of 12.6 cm, a width of 1.3 cm and a thickness of 1.6 mm is preferably 15 mass % or less, more preferably 14 mass % or less and still more preferably 12 mass % or less, and preferably 1 mass % or more and more preferably 5 mass % or more before and after the aging processing in which the molded product is left to stand at 150° C. for 1000 hours under the atmospheric pressure.

The "change rate of chloroform-insoluble component" is a value calculated from the method described below.

A molded product having a length of 12.6 cm, a width of 1.3 cm and a thickness of 1.6 mm is produced. After that, 1) 1 cm×1 cm×1.6 mm is cut out from the lower end of the molded product before aging, and the cut out part is frozen and crushed, then is sieved to collect particles that pass through 500 µm openings and does not pass through 355 µm openings. 200 mg are measured from these particles and taken out, which are immersed in 40 mL of chloroform and are subjected to ultrasonic vibration for 6 hours. After that, the particles are then separated into soluble component and insoluble component via suction filtration. The obtained residue (insoluble component) is subjected to vacuum drying at 100° C. for 2 hours, and the mass of dried residue is weighed. This value is defined as an "initial residue amount." Further, for 2) molded product subjected to the aging processing in which the molded product is left to stand at 150° C. for 1000 hours, the mass of the residue after the processing from cutting out to drying performed in the same manner as 1) is measured. This value is defined as an "amount of residue after aging." Further, based on the values obtained from 1) and 2), the change rate of chloroform-insoluble component (mass %) is calculated from the following formula (X).

[Change rate of chloroform-insoluble component] (mass %)=[residue amount after aging (mg)−initial residue amount (mg)]/[200−initial residue amount (mg)]×100  (X)

(Average Burning Time)

In terms of excellence in surface smoothness, appearance, flame retardance and electrical properties after a long-term thermal aging (e.g. 150° C., 1000 hours), the average burning time of the flame retardant resin composition according to this embodiment before and after the aging processing in which the composition is left to stand at 150° C. for 1000 hours in the ambient atmosphere is preferably 10 seconds or less, more preferably 8 seconds or less, and still more preferably 5 seconds or less.

The average burning time can be measured by the method described below in EXAMPLES.

In terms of impact resistance, the Charpy impact strength of the flame retardant resin composition according to this embodiment is preferably 3.0 to 25 kJ/m$^2$, and more preferably 5.0 to 20 kJ/m$^2$.

The Charpy impact strength can be measured by the method described below in EXAMPLES.

In terms of mechanical strength, the tensile strength of the flame retardant resin composition according to this embodiment is preferably 40 to 90 MPa, and more preferably 50 to 80 MPa.

Note that the tensile strength can be measured by the method described below in EXAMPLES.

(Molded Product)

The molded product according to this embodiment is composed of the above described flame retardant resin composition according to this embodiment.

Examples of the molding method for the flame retardant resin composition may include, but not particularly limited to, for example, injection molding, extrusion molding, vacuum molding, pressure molding, or the like, and in terms of molding appearance and luminance, injection molding is more preferably used.

The molding temperature of the flame retardant resin composition during molding which is the barrel set maximum temperature is preferably in the range of 250 to 350° C., more preferably in the range of 270 to 340° C., and still more preferably in the range of 280 to 330° C. In terms of sufficient molding workability, the molding temperature is preferably 250° C. or more, and in terms of suppressing the heat deterioration of resin, it is preferably 350° C. or less.

The mold temperature of the flame retardant resin composition during molding is preferably in the range of 40 to 170° C., more preferably in the range of 80 to 150° C., and still more preferably in the range of 80 to 130° C. In terms of maintaining a sufficient appearance of molded product, the molding temperature is preferably 40° C. or more, and in terms of molding stability, it is preferably 170° C. or less.

Due to a remarkable long-term thermal aging property, a molded product in this embodiment can be used in various applications such as automobiles, consumer electronics, office equipment, industrial products or the like, and among them, automobile components that require an excellent long-term thermal aging is particularly preferable.

EXAMPLES

Although this embodiment is described in more detail below with examples and comparative examples, it is not limited such examples only.

First, raw materials of the resin composition used in Examples and Comparative Examples are described below.

<(A-1) Polyphenylene Ether (PPE)>

(A-1-1) PPE-1

Precursor (2,6-dimethyl-1,4-phenylene ether)

A 40 L jacketed polymerization tank equipped with a sparger for introduction of an oxygen-containing gas, a stirring turbine blade and a baffle at the bottom thereof and a reflux cooler on a vent gas line at the top thereof was charged with 4.57 g of cupric oxide, 24.18 g of 47 mass % hydrogen bromide aqueous solution, 11.00 g of di-t-butyl-ethylenediamine, 62.72 g of di-n-butylamine, 149.92 g of butyldimethylamine, 20.65 kg of toluene, and 3.12 kg of 2,6-dimethylphenol while blowing nitrogen gas thereinto at a flow rate of 0.5 L/min. The mixture in the polymerization tank was then stirred until a homogeneous solution was obtained and the internal temperature of the polymerization tank reached 25° C. Subsequently, the dry air was introduced into the polymerization tank at a rate of 32.8 NL/min by using the sparger and polymerization was initiated. Dry air was passed for 140 minutes to obtain a polymerization mixture. Throughout the polymerization, the internal temperature was controlled to be 40° C. Passing of the dry air was stopped and 10 kg of a 2.5 mass % aqueous solution of ethylenediaminetetraacetic acid tetrasodium salt (from Dojindo Laboratories) was added to the polymerization mixture. The polymerization mixture was stirred at 70° C. for 150 minutes and was then left to stand for 20 minutes to separate into organic phase and aqueous phase through a liquid-liquid separation.

The resulting organic phase was solidified while continuously being in contact with a methanol, and stirred to obtain a polyphenylene ether slurry solution. This slurry solution was subjected to a wet milling with a disintegrator (product name) from Komatsu Zenoah Co., Ltd. using a 1 mm grid slit. The milled slurry solution was then continuously fed to a Young-filter type vacuum filter to separate solid from liquid and was rinsed with a methanol which is three times the weight of the polyphenylene ether dried on the Young-filter type vacuum filter. Thereafter, the polyphenylene ether particles were dried. The polyphenylene ether particles greater than 1700 μm in the slurry solution after the wet milling was 0 mass %, and the weight average particle diameter was 220 am.

The poly(2,6-dimethyl-1,4-phenylene ether) (PPE-1) obtained from the above described production method has a reduced viscosity of 0.38 dL/g, number average molecular weight of 15,300, terminal OH group per 100 pieces of monomer unit constituting polyphenylene ether of 0.72 pieces, and the number of N,N-dibutylaminomethyl group per 100 pieces of monomer unit constituting polyphenylene ether of 0.43 pieces.

Note that the reduced viscosity was measured at 30° C. using 0.5 g/dL chloroform solution and an Ubbelohde viscosity tube.

<Reactive Compound>
9,10-dihydro-9-oxa-10-sphosphenanthrenanthrene-10-oxid (HCA) (from SANKO CO., LTD.)
Phosphonate dioctyl (from Johoku Chemical Co., Ltd.)
<Structural Unit in Modified PPE>

[Formula 19]

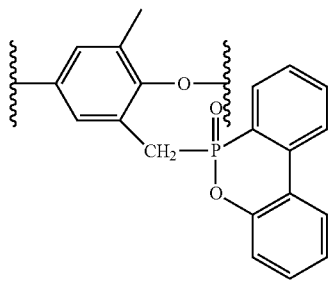

(10)

[Formula 20]

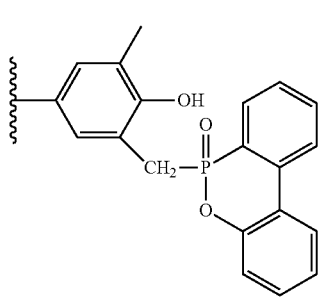

(11)

[Formula 21]

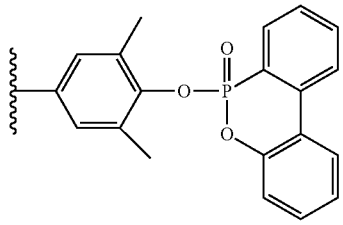

(12)

[Formula 22]

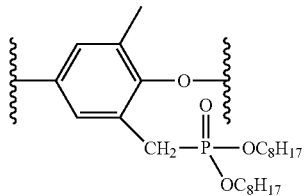

(13)

[Formula 23]

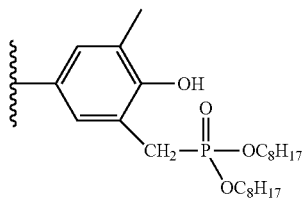

(14)

[Formula 24]

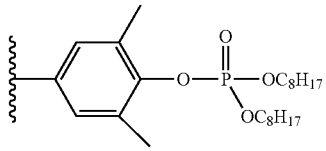

(15)

<(A-2) Other Thermoplastic Resins>
(A-2-1) HIPS
  CT60 from Petrochemicals Corporation
(A-2-2) Polyamide 6,6 (PA66)
  Vydyne® 48BX from Solutia Inc. (US)
(A-2-3) Polypropylene (PP)
  NOVATEC PP, SA08 polypropylene from Japan Polypropylene Co.
(A-2-4) SEBS
  TAIPOL6151 from TSRC Corporation
<(a-c) Compatibilizer>
(A-c-1) Maleic anhydride
  (MAH) from Mitsubishi Chemical Corporation
(A-c-2) Hydrogenated block copolymer (SEBS)
  Copolymer synthesized in accordance with the following method.
  A block copolymer having a B-A-B-A type block structure was synthesized in accordance with a known method under the condition using the polymer block A composed of polystyrene and the polymer block B composed of polybutadiene. The resulting synthesized copolymer was hydrogenated by a known method. The polymer was not modified. The physical properties of the resulting unmodified hydrogenated block copolymer are as follows:
  Polystyrene content in the block copolymer before hydrogenation: 44%; The number average molecular weight (Mn) of block copolymer before hydrogenation: 95,000; The number average molecular weight (Mn) of polystyrene block: 41,800, The number average molecular weight (Mn) of polybutadiene block: 53,200; The molecular weight distribution (Mw/Mn) of the block copolymer before hydrogenation: 1.06; Total vinyl bonding amount (1, 2-vinyl bonding amount) in the polybutadiene block before hydrogenation: 75%; Hydrogenated rate with respect to the polybutadiene part constituting the polybutadiene block: 99.9%

<(B) Condensed Phosphate Ester-Based Flame Retardant>
(B-1) Bisphenol-A bis(diphenyl phosphate) (product name: CR-741® from DAIHACHI CHEMICAL INDUSTRY CO., LTD.)
(B-2) Resorcinol bis[di(2,6-dimethylphenyl)phosphate] (product name: PX202® from DAIHACHI CHEMICAL INDUSTRY CO.)

<(C) Condensed Phosphate>
(C-1) Sodium hexametaphosphate (from TAIYO CHEMICAL INDUSTRY CO., LTD.)
(C-2) Magnesium metaphosphate (from TAIYO CHEMICAL INDUSTRY CO., LTD.)
(C-3) Potassium metaphosphate (from TAIYO CHEMICAL INDUSTRY CO., LTD.)
(C-4) Sodium Tripolyphosphate (from TAIYO CHEMICAL INDUSTRY CO., LTD.)
(C-X) Ammonium polyphosphate (product name: TERRAJU from Chisso Corporation)

<(D) Antioxidant>
(D-1) Phosphorus-Based Antioxidant-1
Chemical name: 3,9-bis(2,6-di-tert-butyl-4-methylphenoxy)-2,4,8,10-tetraoxa-3,9-diphosphaspiro[5.5]undecane
(Product name: ADK Stab PEP-36® from ADEKA CORPORATION)

Examples 1 to 17, Comparative Examples 1 to 10

In Examples and Comparative Examples, resin composition pellets were obtained by adding each component from a first raw material feed port, a second raw material feed port and a liquid adding position of a twin screw extruder (from Coperion Inc., ZSK-40MC) in the proportion as illustrated in Table 1 at a barrel temperature of 320° C. and extrusion conditions as illustrated in Table 1. The number of rotation of the extruder was optionally set so that a target residence time can be obtained. When observing the morphology of each molded product produced from the resin composition of Examples 1 to 17 by the following method, it was found that the component containing (A-1) formed a continuous phase. The evaluation results of the resin composition are shown in Table 1.

[Change Rate of Chloroform-Insoluble Component]
A molded product having a length of 12.6 cm, a width of 1.3 cm and a thickness of 1.6 mm was produced from the resulting resin composition. After that, 1) 1 cm×1 cm×1.6 mm was cut out from the lower end of the molded product before aging, and the cut out part was frozen and crushed, then was sieved to collect particles that passed through 500 m openings and did not pass through 355 m openings. 200 mg of particles were measured and taken out, which was immersed in 40 mL of chloroform and was subjected to ultrasonic vibration for 6 hours. Thereafter, it was separated into soluble components and insoluble components via suction filtration. The obtained residue (insoluble components) was subjected to vacuum drying at 100° C. for 2 hours, and the mass of the dried residue was weighed. This value was defined as an "initial residue amount. Further, with respect to 2) a molded product subjected to the aging processing in which the molded product was left to stand at 150° C. for 1000 hours, after the molded product was subjected to the process from cutting out to drying in the same manner as 1), the mass of the residue was measured. This value was defined as an "amount of residue after aging." Then, based on the values obtained from 1) and 2), the change rate of chloroform-insoluble component (mass %) was calculated by the following formula (I).

[Change rate of chloroform-insoluble component]
(mass %)=[residue amount after aging (mg)−
initial residue amount (mg)]/[200−initial residue
amount (mg)]×100     (I)

[Morphology]
An ultrathin section having a thickness of several tens to several hundreds was produced from a molded product produced in the same manner as the above described [change rate of chloroform-insoluble component] by using an ultra microtome. After that, the ultrathin section was stained by using known stains such as ruthenium tetroxide, phosphotungstic acid or the like depending on the thermoplastic resin or the compatibilizer to be used, for example. After that, the ultra thin section after stain was observed by using TEM (product name: "HT7700" from Hitachi High-Technologies Corporation) to obtain a 10,000× image. The obtained image was observed to determine if the component containing the component of (A-1) forms a continuous phase.

[PPE Terminal OH Group Concentration]
Each extrusion sample was dissolved in chloroform. Subsequently, the solution and the purified water of the same amount as that of the solution were respectively put into a liquid-separation funnel and were subjected to a liquid separating operation three times to remove hydrophilic substance in the aqueous phase. After the obtained organic phase was reprecipitated with a methanol, precipitates were washed by methanol to remove antioxidant. Next, the precipitates were washed well by acetone to remove unreacted low-molecular compound. After filtration, the residue was dried and completely dissolved while gradually adding dichloromethane at 50° C. The resulting solution was left to stand in an atmosphere at 3° C. overnight to allow only PPE compound to be recrystallized. This crystal was filtered while being washed by dichloromethane at 3° C. to isolate PPE components.

The PPE component isolated in the above described manner was measured by a $^{13}$C-NMR proton inverse gated decoupling method (quantitative measurement), and a ratio of spectrum of the carbon at the first place (146.1 ppm) bonded to the terminal OH group relative to the carbon at the first place (145.4 ppm, 151.4 ppm) in the side chain was calculated, and thus the terminal OH group concentration (the number of terminal OH group per 100 units of monomer unit constituting PPE) (pieces) was determined.

[Flame Retardance]
The pellets of resin composition obtained from Examples and Comparative Examples were fed to the screw line type injection molding machine set at 240 to 320° C. to mold a test specimen (1.6 mm thick) for UL-94 vertical burning test measurement by injection under the condition of mold temperature of 90° C. The flame retardance was evaluated based on UL-94 vertical burning test by using 5 test specimens molded in the above described manner. Each of the 5 pieces were in contact with the flame for 10 seconds, and then the burning time from separation from the flame to extinction was defined as t1 (sec.) and after the 5 pieces were again in contact with the flame for 10 seconds, the burning time from separation from the flame to extinction was defined as t2 (sec.). Then with respect to each of the 5 pieces, the average burning time (sec.) of 10 times (t1 and t2) was calculated.

A test specimen (1.6 mm thick) for UL-94 vertical burning test obtained in the same manner as the above described flame retardance test was suspended with clips in a geer oven at 150° C. and was subjected to thermal aging for 1000 hours while rotating it so that it can be uniformly heated. The damper opening of the geer oven at that time was set to 50%. The test specimen after the thermal aging was taken out and the flame retardance thereof was evaluated based on the UL-94 vertical burning test, then t1 and t2 were measured. Further, the average burning time (sec.) of 10 times (t1 and t2) was calculated.

[Charpy Notched Impact Strength]
Each pellet of resin composition obtained from Examples and Comparative Examples was fed to the screw line type injection molding machine set at 240 to 320° C. to mold a multipurpose test specimen of JIS K7139 A type under the condition of mold temperature of 40 to 120° C. A test specimen was cut out from the multipurpose test specimen to evaluate Charpy impact strength (kJ/m$^2$) under the condition of a temperature of 23° C. in accordance with ISO 179.

[Tensile Strength]
Each pellet of resin composition obtained from Examples and Comparative Examples was fed to the screw line type injection molding machine set at 240 to 320° C. to mold a multipurpose test specimen in accordance with ISO 3167 under the condition of mold temperature of 40 to 120° C. The resulting multipurpose specimen (type A) was used and a tensile test was performed with a tensile speed of 50 mm/sec. in accordance with ISO 527 to measure the tensile strength (MPa).

[Surface Smoothness after Aging]

A flat molded product having a length of 10 cm, a width of 4.8 cm and a thickness of 4.0 mm was produced from the resulting resin composition, and the depth Ra of each recess observed at 5 viewing fields (each having a size of 0.15 mm×0.15 mm) located within 1 cm×1 cm square in the center of the plane of the molded product before and after the aging processing at 150° C. for 500 hours was measured to determine the average value (average depth) of all depths Ra.

Then, if the value of [average depth after aging]/[average depth before aging] was within the range of 0.9 to 1.1, it was evaluated as "pass", and if not, it was evaluated as "fail".

[Electrical Properties]

A flat molded product having a length of 10 cm, a width of 4.8 cm and a thickness of 4.0 mm was produced from the resulting resin composition, and CTI with 500V after the aging processing at 150° C. for 500 hours was measured in accordance with JIS C134 method, then evaluated as pass or fail.

[Amount of Reactive Compound Added to Polyphenylene Ether]

(Amount Added to Methyl Group)

A total amount of reactive compound added to a terminal methyl group and a side chain methyl group is obtained by dividing an integral value of a peak appearing at from 2.8 to 3.6 ppm in $^1$H-NMR, which is an integral value of a peak of methylene adding a reactive compound, by an integral value of a peak appearing at from 6.0 to 7.0 ppm, which originated from an aromatic ring of polyphenylene ether. Then, amount (pieces) added to a terminal methyl group and a side chain methyl group per 100 units of monomer unit constituting a polyphenylene ether is determined.

Further, a ratio of the amount added to a side chain methyl group with respect to the amount added to a terminal methyl group is obtained by dividing an integral value appearing at from 36 to 45 ppm in $^{31}$P-NMR, which originated from an adduct binding to main chain methyl group by an integral value appearing at from 30 to 36 ppm, which originated from adduct binding to a side chain methyl group.

Measurement conditions of $^1$H-NMR and $^{31}$P-NMR are shown below.

Measurement conditions of $^1$H-NMR
Device: JEOL-ECA500
Observed nuclear: $^1$H
Observed frequency: 500.16 MHz
Measuring method: Single-Plus
Pulse width: 7 μsec.
Waiting time: 5 seconds
Cumulated number: 512 times
Solvent: CDCl$_3$
Sample concentration: 5 w %
Chemical shift reference: TMS 0.00 ppm
Measurement conditions of $^{31}$P-NMR
Device: JEOL RESONANCE ECS400
Observed nuclear: $^{31}$P
Observed frequency: 161.8 MHz
Pulse width: 45°
Waiting time: 5 seconds
Cumulated number: 10,000 times
Solvent: CDCl$_3$
Sample concentration: 20 w/v %
Chemical shift reference: 85% phosphoric acid aqueous solution (external reference) 0 ppm (Amount Added to Terminal OH Group)

The amount can be determined by using, based on the $^{13}$C-NMR, an integral value [A] of a peak at 146.4 ppm (a carbon adjacent to an oxygen atom of ether bond formed by adding a reactive compound to OH group) and an integral value [B] of a peak at 145.4 ppm (a carbon adjacent to OH group) from the formula (VI) shown below.

The number (pcs.) of reactive compound added to a terminal OH group per 100 units of monomer unit constituting a polyphenylene ether=(the number of terminal OH per 100 units of monomer unit constituting a precursor polyphenylene ether)×{[A]/([A]+[B])} (VI)

Measurement conditions of $^{13}$C-NMR are shown below.
Measurement conditions of $^{13}$C-NMR
Device: Bruker Biospin Avance 600
Observed nuclear: $^{13}$C
Observed frequency: 150.9 MHz
Measuring method: Inverse gated decoupling method
Pulse width: 30°
Waiting time: 10 seconds
Cumulated number: 2,000 times
Solvent: CDCl$_3$
Sample concentration: 20 w/v %
Chemical shift reference: TMS 0 ppm

TABLE 1

| Resin composition production method | | | | | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|---|---|---|---|
| First raw material feed port | (A-1) PPE | Precursor PPE | (A-1-1) PPE-1 | parts by mass | 70 | 70 | 70 | 70 | 70 | 70 | 80 | 50 | 70 | 70 | 70 | 70 | 70 | 70 |
| | | Reactive compound | HCA | parts by mass | — | — | — | — | — | — | — | — | 1 | 1 | 1 | 1 | 1 | 1 |
| | | | Dioctyl phosphate | parts by mass | — | — | — | — | — | — | — | — | — | — | — | — | — | — |
| | | Type of structural unit contained in modified PPE | | — | — | — | — | — | — | — | — | — | Formulae (10) to (12) | Formulae (10) to (12) | Formulae (10) to (12) | Formulae (10) to (12) | Formulae (10) to (12) | Formulae (10) to (12) |
| | | Amount added to terminal methyl group and side chain methyl group | | piece | — | — | — | — | — | — | — | — | 0.25 | 0.4 | 0.38 | 0.11 | 0.25 | 0.25 |
| | | Proportion of amount added to side chain methyl group with respect to amount added to terminal methyl group | | mol % | — | — | — | — | — | — | — | — | 27 | 20 | 21 | 29 | 27 | 27 |
| | | Amount added to terminal OH group | | piece | — | — | — | — | — | — | — | — | 0.03 | 0.09 | 0.08 | 0.01 | 0.03 | 0.03 |
| | (A-2) Other thermoplastic resins | (A-2-1) HIPS | | parts by mass | 25 | 25 | 25 | 25 | 25 | 25 | 15 | 45 | 25 | 25 | 25 | 25 | 25 | 25 |
| | | (A-2-3) PP | | parts by mass | — | — | — | — | — | — | — | — | — | — | — | — | — | — |
| | | (A-2-4) SEBS | | parts by mass | 5 | 5 | 5 | 5 | 5 | 5 | 5 | 5 | 5 | 5 | 5 | 5 | 5 | 5 |
| | (A-c) | (A-c-1) MAH | | parts by mass | — | — | — | 1 | — | — | — | — | — | — | — | — | — | — |
| | Compatibilizer | (A-c-2) SEBS | | parts by mass | — | — | 1 | — | — | — | — | — | — | — | — | — | — | — |
| | (B) Condensed phosphoric ester-based flame retardant | (B-2) PX-202 | | parts by mass | — | — | — | — | 10 | — | — | — | — | — | — | — | — | — |
| | (C) Condensed phosphate metal salt | (C-1) Hexametaphosphoric acid Na | | parts by mass | 1 | — | — | — | — | 1 | 1 | 1 | — | — | — | — | — | — |
| | | (C-2) Magnesium metaphosphate | | parts by mass | — | 1 | — | — | — | — | — | — | — | — | — | — | — | — |
| | | (C-3) Potassium metaphosphate | | parts by mass | — | — | — | — | — | — | — | — | — | — | — | — | 0.2 | — |
| | | (C-4) Sodium Tripolyphosphate | | parts by mass | — | — | — | — | — | — | — | — | — | — | — | — | — | 0.2 |

TABLE 1-continued

| | | | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|---|---|
| | | (C-X) Ammonium polyphosphate | parts by mass | — | — | — | — | — | — | — | — | — | — | — | — | — | — |
| | (D) Antioxidant | (D-1) PEP-36 | parts by mass | — | — | — | — | — | 1 | 1 | 1 | — | — | — | — | — | — |
| Second raw material feed port | (A-2) Other thermoplastic resins | (A-2-2) PA | parts by mass | — | — | — | — | — | — | — | — | — | — | — | — | — | — |
| | | (A-2-3) PP | parts by mass | — | — | — | — | — | — | — | — | — | — | — | — | — | — |
| Liquid adding pump | (B) Condensed phosphoric ester-based flame retardant | (B-1) BDP | parts by mass | 10 | 10 | 10 | 10 | — | 10 | 10 | 10 | 10 | 10 | 10 | 10 | 10 | 10 |
| Extruding conditions | Residence time | | second | 40 | 40 | 40 | 40 | 40 | 40 | 40 | 40 | 40 | 55 | 40 | 30 | 40 | 40 |
| | Total L/D of screw kneading zone | | — | 13 | 13 | 13 | 13 | 13 | 13 | 13 | 13 | 13 | 13 | 20 | 10 | 13 | 13 |
| Resin composition | (A) Thermoplastic resin | | parts by mass | 100 | 100 | 100 | 100 | 100 | 100 | 100 | 100 | 128 | 121 | 122 | 130 | 128 | 128 |
| | (B) Condensed phosphoric ester-based flame retardant | | parts by mass | 10 | 10 | 10 | 10 | 10 | 10 | 10 | 10 | 10 | 10 | 10 | 10 | 10 | 10 |
| | (C) Condensed phosphate metal salt | | parts by mass | 1 | 1 | 1 | 1 | 1 | 1 | 1 | 1 | 0 | 0 | 0 | 0 | 0.2 | 0.2 |
| | (D) Antioxidant | | parts by mass | 0 | 0 | 0 | 0 | 0 | 1 | 1 | 1 | 0 | 0 | 0 | 0 | 0 | 0 |
| Evaluation | Change rate of chloroform-insoluble component | | mass % | 11 | 14 | 13 | 14 | 12 | 10 | 14 | 7 | 12 | 7 | 8 | 14 | 10 | 9 |
| | Terminal OH group concentration | | piece | 1.5 | 1.5 | 1.5 | 1.5 | 1.5 | 1.4 | 1.4 | 1.4 | 0.7 | 0.3 | 0.4 | 1.1 | 0.7 | 0.7 |
| | Flame retardancy | Before aging | second | 2.2 | 2.3 | 2.4 | 2.1 | 2.5 | 2.0 | 1.5 | 5.0 | 2.4 | 2.2 | 2.3 | 2.4 | 2.2 | 2.0 |
| | | After aging (150° C., 1000 hr) | second | 7.0 | 8.5 | 7.8 | 8.6 | 8.0 | 8.8 | 9.9 | 9.0 | 8.6 | 5.4 | 5.8 | 9.9 | 7.6 | 7.2 |
| | Charpy impact strength (notched) | | kJ/m² | 11.5 | 11 | 11 | 10.5 | 10 | 12 | 14 | 7.7 | 10.5 | 10.5 | 10.5 | 10.5 | 10.5 | 10.5 |
| | Tensile strength | | MPa | 72 | 72 | 71 | 70 | 67 | 72 | 80 | 60 | 70 | 68 | 68 | 70 | 71 | 71 |
| | Surface smoothness after aging (150° C., 500 hr) | | — | Pass | Pass | Pass | Pass | Pass | Pass | Pass | Pass | Pass | Pass | Pass | Pass | Pass | Pass |
| | Electrical property (CTI) | Before aging | — | Pass | Pass | Pass | Pass | Pass | Pass | Pass | Pass | Pass | Pass | Pass | Pass | Pass | Pass |
| | | After aging (150° C., 500 hr) | — | Pass | Pass | Pass | Pass | Pass | Pass | Pass | Pass | Pass | Pass | Pass | Pass | Pass | Pass |

TABLE 2

| | | | Example 15 | Example 16 | Example 17 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|---|---|---|
| Resin composition production method | First raw material feed port | (A-1) PPE Precursor PPE (A-1-1) PPE-1 parts by mass | 70 | 70 | 70 | 70 | 70 | 70 | 70 | 70 | 70 | 70 | 70 | 70 | 70 |
| | | Reactive compound HCA parts by mass | — | 1 | 1 | — | — | — | — | — | — | — | — | 1 | 1 |
| | | Dioctyl phosphate parts by mass | 1 | — | — | — | — | — | — | — | — | — | — | — | — |
| | | Type of structure unit contained in modified PPE | Formulae (13) to (15) | Formulae (10) to (12) | Formulae (10) to (12) | — | — | — | — | — | — | — | Formulae (10) and (11) | Formulae (10) and (11) | Formulae (10) and (11) |
| | | Amount added to terminal methyl group and side chain methyl group piece | 0.25 | 0.22 | 0.21 | — | — | — | — | — | — | — | 0.05 | 0.08 | 0.05 |
| | | Proportion of amount added to side chain methyl group with respect to amount added to terminal Methyl group mol % | 27 | 27 | 27 | — | — | — | — | — | — | — | 35 | 33 | 35 |
| | | Amount added to terminal OH group piece | 0.03 | 0.03 | 0.03 | — | — | — | — | — | — | — | 0 | 0 | 0 |
| | | (A-2) Other thermoplastic resin (A-2-1) HIPS parts by mass | 25 | — | — | 25 | 15 | 25 | 25 | — | — | 25 | 25 | 25 | — |
| | | (A-2-3) PP parts by mass | — | 5 | 5 | — | — | — | — | — | 5 | — | — | — | 5 |
| | | (A-2-4) SEBS parts by mass | 5 | 5 | 5 | 5 | 5 | 5 | 5 | 5 | 5 | 5 | 5 | 5 | 5 |
| | | (A-c) Compatibilizer (A-c-1) MAH parts by mass | — | 0.1 | — | — | — | — | — | 0.1 | — | — | — | — | 0.1 |
| | | (A-c-2) SEBS parts by mass | — | — | 10 | — | — | — | — | — | 10 | — | — | — | — |
| | | (B) Condensed phosphoric ester-based flame retardant (B-2) PX-202 parts by mass | — | — | — | — | — | — | 10 | — | — | — | — | — | — |
| | | (C) Condensed phosphate metal salt (C-1) Hexametaphosphoric acid Na parts by mass | 0.2 | 2 | 2 | — | — | — | — | — | — | — | — | — | 2 |
| | | (C-2) Magnesium metaphosphate parts by mass | — | — | — | — | — | — | — | — | — | — | — | — | — |
| | | (C-3) Potassium metaphosphate parts by mass | — | — | — | — | — | — | — | — | — | — | — | — | — |
| | | (C-4) Sodium Tripolyphosphate parts by mass | — | — | — | — | — | — | — | — | — | — | — | — | — |

TABLE 2-continued

| | | | Example 15 | Example 16 | Example 17 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|---|---|---|
| Second raw material feed port | (C-X) Ammonium polyphosphate | parts by mass | — | — | — | — | — | — | — | — | — | 1 | — | — | — |
| | (D) Antioxidant (D-1) PEP-36 | parts by mass | — | 1 | 1 | — | — | 1 | — | 1 | 1 | — | — | — | 1 |
| | (A-2) Other thermoplastic resins (A-2-2) PA | parts by mass | — | 25 | — | — | — | — | — | 25 | — | — | — | — | 25 |
| | (A-2-3) PP | parts by mass | — | — | 20 | — | — | — | — | — | 20 | — | — | — | — |
| Liquid adding pump | (B-1) BDP | parts by mass | 10 | 5 | 5 | 10 | 20 | 10 | — | 5 | 5 | 10 | 10 | 10 | 5 |
| Extruding conditions | Residence time | second | 40 | 40 | 40 | 40 | 40 | 40 | 40 | 40 | 40 | 40 | 40 | 20 | 40 |
| | Total L/D of screw kneading zone | — | 13 | 13 | 13 | 13 | 13 | 13 | 13 | 13 | 13 | 13 | 5 | 13 | 5 |
| Resin composition | (A) Thermoplastic resin | parts by mass | 128 | 128.4 | 138 | 100 | 90 | 100 | 100 | 100.1 | 110 | 100 | 136 | 134 | 136.2 |
| | (B) Condensed phosphoric ester-based flame retardant | parts by mass | 10 | 5 | 5 | 10 | 20 | 10 | 10 | 5 | 5 | 10 | 10 | 10 | 5 |
| | (C) Condensed phosphate metal salt | parts by mass | 0.2 | 2 | 2 | 0 | 0 | 0 | 0 | 0 | 0 | 1 | 0 | 0 | 2 |
| | (D) Antioxidant | parts by mass | 0 | 1 | 1 | 0 | 0 | 1 | 0 | 1 | 1 | 0 | 0 | 0 | 1 |
| Evaluation | Change rate of chloroform-insoluble component | mass % | 8 | 11 | 14 | 39 | 28 | 20 | 44 | 24 | 26 | 36 | 22 | 21 | 22 |
| | Terminal OH group concentration | piece | 0.3 | 0.6 | 0.6 | 1.5 | 1.3 | 1.5 | 1.5 | 1.9 | 1.9 | 1.5 | 1.2 | 1.1 | 1.2 |
| | Flame retardancy Before aging | second | 3.2 | 4.2 | 4.0 | 2.6 | 1.5 | 3.0 | 2.5 | 4.0 | 4.5 | 2.6 | 3.0 | 2.8 | 5.0 |
| | After aging (150° C., 1000 hr) | second | 6.0 | 7.2 | 7.5 | 28.5 | 15.0 | 16.8 | 31.4 | 20.1 | 19.5 | 22.4 | 14.2 | 11.0 | 15.8 |
| | Charpy impact strength (notched) | kJ/m² | 9.5 | 9 | 8.5 | 10.5 | 6.3 | 10 | 8.5 | 7.8 | 7.5 | 9.9 | 10.5 | 10.5 | 9 |
| | Tensile strength | MPa | 65 | 66 | 65 | 70 | 55 | 71 | 60 | 65 | 60 | 69 | 60 | 65 | 60 |
| | Surface smoothness after aging (150° C., 500 hr) | — | Pass | Pass | Pass | Fail | Fail | Fail | Fail | Fail | Fail | Fail | Fail | Fail | Pass |
| | Electrical property (CTI) Before aging | — | Pass | Pass | Pass | Pass | Fail | Pass | Pass | Pass | Pass | Pass | Pass | Pass | Pass |
| | After aging (150° C., 500 hr) | — | Pass | Pass | Pass | Fail | Fail | Fail | Fail | Fail | Fail | Fail | Fail | Fail | Fail |

INDUSTRIAL APPLICABILITY

According to this disclosure, a polyphenylene ether-based flame retardant resin composition that has both an excellent flame retardance and long-term flame retardance while keeping mechanical and electrical properties of a polyphenylene ether can be realized, and a thermoplastic resin molded product applicable to electrical/electronic parts and automobile parts requiting a high thermal aging resistance can be provided.

The invention claimed is:

1. A flame retardant resin composition containing a polyphenylene ether and condensed phosphate metal salt, wherein,
    based on UL94 flammability test, an average burning time of a molded product having a length of 12.6 cm, a width of 1.3 cm and a thickness of 1.6 mm formed of the flame retardant resin composition before and after an aging processing in which the molded product is left to stand at 150° C. for 1000 hours under atmospheric pressure is within 10 seconds, and
    a change rate of a chloroform-insoluble component of the molded product before and after the aging processing is 15 mass % or less.

2. The flame retardant resin composition according to claim 1, wherein the polyphenylene ether contains at least one structural units selected from a group consisting of formulae (1), (2) and (3) shown below:

[Formula 1]

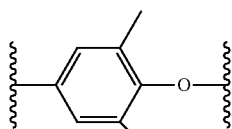
(1)

[Formula 2]

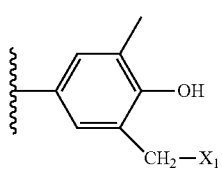
(2)

where $X_1$ in the formulae (1) and (2) is one group selected from the following formulae,

[Formula 3]

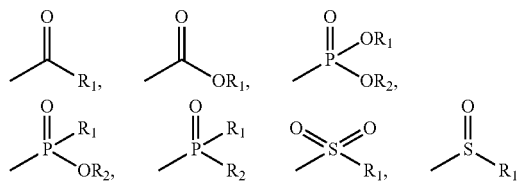

where $R_1$ and $R_2$ in $X_1$ are each independently a substituent having a carbon number of at least 1,

[Formula 4]

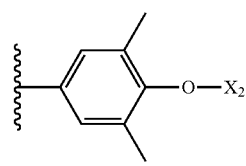
(3)

where $X_2$ in formula (3) is one group selected from the following formulae,

[Formula 5]

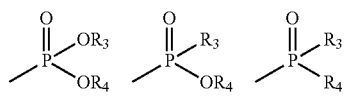

and where $R_3$ and $R_4$ in $X_2$ are each independently a group selected from a group consisting of a hydrogen atom, an alkyl group, an aryl group, an alkylamino group and an arylamino group, and $R_3$ and $R_4$ may form a cyclic structure through bonding of carbon atoms contained in $R_3$ and $R_4$, with the proviso that formula (3) substantially has no carbon-carbon double bond other than a double bond of an aromatic ring.

3. The flame retardant resin composition according to claim 2, wherein the polyphenylene ether contains a structural unit represented by the formulae (1) and/or (2) and a structural unit represented by the formula (3).

4. The flame retardant resin composition according to claim 2, wherein $X_1$ in the formulae (1) and (2) is a group selected from the following formulae,

[Formula 6]

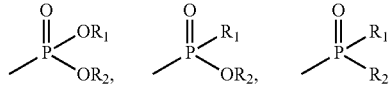

and $R_1$ and $R_2$ in $X_1$ are each independently a substituent having a carbon number of at least 1.

5. The flame retardant resin composition according to claim 2, wherein the polyphenylene ether has 0.01 to 10 units of any structural units selected from a group consisting of the formulae (1), (2) and (3) per 100 units of monomer unit constituting the polyphenylene ether, and a mole percent of the structural unit represented by the formula (1) with respect to the structural unit represented by the formula (2) is 0 to 30 mol %.

6. The flame retardant resin composition according to claim 1, further containing (B) condensed phosphate ester-based flame retardant.

7. The flame retardant resin composition according to claim 6, containing 0.1 to 40 parts by mass of (B) condensed phosphate ester-based flame retardant with respect to 100 parts by mass of the polyphenylene ether.

8. The flame retardant resin composition according to claim 1, containing 0.1 to 5.0 parts by mass of the condensed phosphate metal salt with respect to 100 parts by mass of the polyphenylene ether.

9. The flame retardant resin composition according to claim 1, further containing (D) antioxidant, wherein (D) antioxidant content is 0.1 to 5.0 parts by mass with respect to 100 parts by mass of the polyphenylene ether.

10. The flame retardant resin composition according to claim 1, wherein a number average molecular weight of the polyphenylene ether is 10,000 or more.

11. The flame retardant resin composition according to claim 1, wherein the flame retardant resin composition is free of polyamide resin.

12. The flame retardant resin composition according to claim 1, wherein the condensed phosphate metal salt is at least one of alkali metal salt and alkali-earth metal salt.

13. The flame retardant resin composition according to claim 1, wherein the condensed phosphate metal salt is selected from a group consisting of sodium hexametaphosphate, magnesium metaphosphate, potassium metaphosphate, and sodium tripolyphosphate.

* * * * *